US009230403B2

(12) United States Patent
O'Brien

(10) Patent No.: US 9,230,403 B2
(45) Date of Patent: *Jan. 5, 2016

(54) METHOD, APPARATUS, AND COMPUTER-READABLE MEDIA FOR ENABLING REAL-TIME COMPETITION BASED ON LIVE EVENTS

(71) Applicant: Iconic Worldwide Gaming Ltd., Cheshire (GB)

(72) Inventor: Patrick Damien O'Brien, Cheshire (GB)

(73) Assignee: ICONIC WORLDWIDE GAMING LIMITED, Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,485

(22) Filed: Jul. 16, 2014

(65) Prior Publication Data

US 2014/0342793 A1 Nov. 20, 2014

Related U.S. Application Data

(63) Continuation-in-part of application No. 14/257,984, filed on Apr. 21, 2014, now Pat. No. 9,047,732, which is a continuation of application No. 13/894,037, filed on May 14, 2013, now Pat. No. 8,727,868, application (Continued)

(51) Int. Cl.
*G07F 17/00* (2006.01)
*G07F 19/00* (2006.01)
(Continued)

(52) U.S. Cl.
CPC .............. *G07F 17/326* (2013.01); *G06Q 50/34* (2013.01); *G07F 17/3244* (2013.01);
(Continued)

(58) Field of Classification Search
CPC . G07F 17/32; G07F 17/3211; G07F 17/3213; G07F 17/3225; G07F 17/323; G07F 17/3276; G07F 17/3288; G07F 17/326; G07F 17/3244; G07F 17/3286; G07F 17/3293; G07F 17/3272; G06Q 50/34; G06Q 40/04
USPC ........ 463/1, 9, 16, 25, 29–33, 40–43; 705/35, 705/36 R, 37
See application file for complete search history.

(56) References Cited

U.S. PATENT DOCUMENTS 5,608,620 A * 3/1997 Lundgren ...................... 705/1.1
5,749,785 A * 5/1998 Rossides ......................... 463/25
(Continued)

OTHER PUBLICATIONS

Notice from the European Patent Office dated Oct. 1, 2007 concerning business methods, Official Journal of the European Patent Office, Munchen, DE vol. 30, No. 11, Nov. 1, 2007, pp. 592-593, XP007905525, ISSN: 0170-9291.

*Primary Examiner* — Milap Shah

(57) ABSTRACT

Methods, apparatus, and computer-readable media for enabling real-time competition based on a commodity. An exemplary computer-implemented method comprises receiving information corresponding to a selection of a commodity and a competitive position associated with the commodity, the competitive position being based on the value of the commodity over a specified duration of time, transmitting information to a computing device associated with the user for display as an entertaining experience during the specified duration of time, the entertaining experience including a real-time state of the competitive position relative to the real-time value of the commodity, and transmitting, after the specified duration of time has ended, outcome information to the computing device associated with the user, the outcome information indicating whether the real-time data at the end of the specified duration of time was consistent with the competitive position.

20 Claims, 29 Drawing Sheets

Related U.S. Application Data

No. 14/333,485, which is a continuation-in-part of application No. 14/257,985, filed on Apr. 21, 2014, now Pat. No. 9,033,798, which is a continuation of application No. 13/899,569, filed on May 22, 2013, now Pat. No. 8,727,869.

(60) Provisional application No. 61/789,843, filed on Mar. 15, 2013, provisional application No. 61/810,582, filed on Apr. 10, 2013, provisional application No. 61/812,719, filed on Apr. 16, 2013, provisional application No. 61/815,112, filed on Apr. 23, 2013, provisional application No. 61/847,062, filed on Jul. 16, 2013.

(51) Int. Cl.
*G07F 17/32* (2006.01)
*G06Q 50/34* (2012.01)
*G06Q 40/04* (2012.01)

(52) U.S. Cl.
CPC ....... *G07F 17/3272* (2013.01); *G07F 17/3286* (2013.01); *G07F 17/3288* (2013.01); *G07F 17/3293* (2013.01); *G06Q 40/04* (2013.01)

(56) References Cited

U.S. PATENT DOCUMENTS

| | | | |
|---|---|---|---|
| 6,236,900 B1* | 5/2001 | Geiger | 700/91 |
| 6,325,721 B1* | 12/2001 | Miyamoto et al. | 463/40 |
| 6,473,084 B1* | 10/2002 | Phillips et al. | 345/440 |
| 6,659,861 B1* | 12/2003 | Faris et al. | 463/1 |
| 6,709,330 B1* | 3/2004 | Klein et al. | 463/9 |
| 7,040,982 B1* | 5/2006 | Jarvis et al. | 463/9 |
| 7,306,514 B2* | 12/2007 | Amaitis et al. | 463/6 |
| 7,566,268 B2* | 7/2009 | Asher et al. | 463/17 |
| 7,566,270 B2* | 7/2009 | Amaitis et al. | 463/22 |
| 7,637,807 B2* | 12/2009 | Asher et al. | 463/19 |
| 7,693,778 B2* | 4/2010 | Nafeh | 705/37 |
| 7,708,636 B2* | 5/2010 | Asher et al. | 463/22 |
| 7,789,754 B2* | 9/2010 | Asher et al. | 463/22 |
| 8,086,510 B2* | 12/2011 | Amaitis et al. | 705/35 |
| 8,118,654 B1* | 2/2012 | Nicolas et al. | 463/9 |
| 8,275,694 B2* | 9/2012 | Tzroya | 705/37 |
| 8,568,222 B2* | 10/2013 | Gagner et al. | 463/25 |
| 8,727,868 B1* | 5/2014 | O'Brien | 463/25 |
| 8,727,869 B1* | 5/2014 | O'Brien | 463/25 |
| 9,033,798 B2* | 5/2015 | O'Brien | 463/31 |
| 9,047,732 B2* | 6/2015 | O'Brien | 1/1 |
| 2001/0032169 A1* | 10/2001 | Sireau | 705/37 |
| 2002/0013762 A1* | 1/2002 | Yoshimi et al. | 705/37 |
| 2002/0026321 A1* | 2/2002 | Faris et al. | 705/1 |
| 2002/0073021 A1* | 6/2002 | Ginsberg et al. | 705/38 |
| 2002/0153656 A1* | 10/2002 | Maksymec et al. | 273/138.1 |
| 2002/0155884 A1* | 10/2002 | Updike | 463/25 |
| 2002/0155885 A1* | 10/2002 | Shvili | 463/25 |
| 2003/0078087 A1* | 4/2003 | Kojima et al. | 463/6 |
| 2003/0157976 A1* | 8/2003 | Simon et al. | 463/1 |
| 2003/0204566 A1* | 10/2003 | Dhupelia et al. | 709/205 |
| 2004/0204232 A1* | 10/2004 | Asher et al. | 463/25 |
| 2005/0003878 A1* | 1/2005 | Updike | 463/16 |
| 2005/0027643 A1* | 2/2005 | Amaitis et al. | 705/37 |
| 2005/0116410 A1* | 6/2005 | Vlazny et al. | 273/139 |
| 2005/0197938 A1* | 9/2005 | Davie et al. | 705/35 |
| 2005/0197939 A1* | 9/2005 | Davie et al. | 705/35 |
| 2005/0197948 A1* | 9/2005 | Davie et al. | 705/37 |
| 2005/0208996 A1* | 9/2005 | Friedman | 463/25 |
| 2005/0245305 A1* | 11/2005 | Asher et al. | 463/16 |
| 2005/0245306 A1* | 11/2005 | Asher et al. | 463/16 |
| 2005/0245308 A1* | 11/2005 | Amaitis et al. | 463/20 |
| 2005/0245310 A1* | 11/2005 | Amaitis et al. | 463/20 |
| 2006/0014583 A1* | 1/2006 | Harris et al. | 463/25 |
| 2006/0105839 A1* | 5/2006 | Graeve et al. | 463/42 |
| 2006/0105840 A1* | 5/2006 | Graeve | 463/42 |
| 2006/0199631 A1* | 9/2006 | McGill et al. | 463/16 |
| 2006/0247056 A1* | 11/2006 | Luckerson | 463/42 |
| 2007/0265092 A1* | 11/2007 | Betteridge | 463/42 |
| 2009/0061995 A1* | 3/2009 | Assia et al. | 463/25 |
| 2009/0062016 A1* | 3/2009 | Assia et al. | 463/42 |
| 2010/0035673 A1* | 2/2010 | Kertcher et al. | 463/9 |
| 2010/0041453 A1* | 2/2010 | Grimm, Jr. | 463/6 |
| 2010/0144425 A1* | 6/2010 | Dannenberg | 463/25 |
| 2011/0065494 A1* | 3/2011 | Kennedy et al. | 463/25 |
| 2011/0098096 A1* | 4/2011 | Odom et al. | 463/17 |
| 2012/0178535 A1* | 7/2012 | Short | 463/42 |
| 2012/0283000 A1* | 11/2012 | Volkov | 463/25 |
| 2014/0162786 A1* | 6/2014 | Hartleip | 463/42 |

* cited by examiner

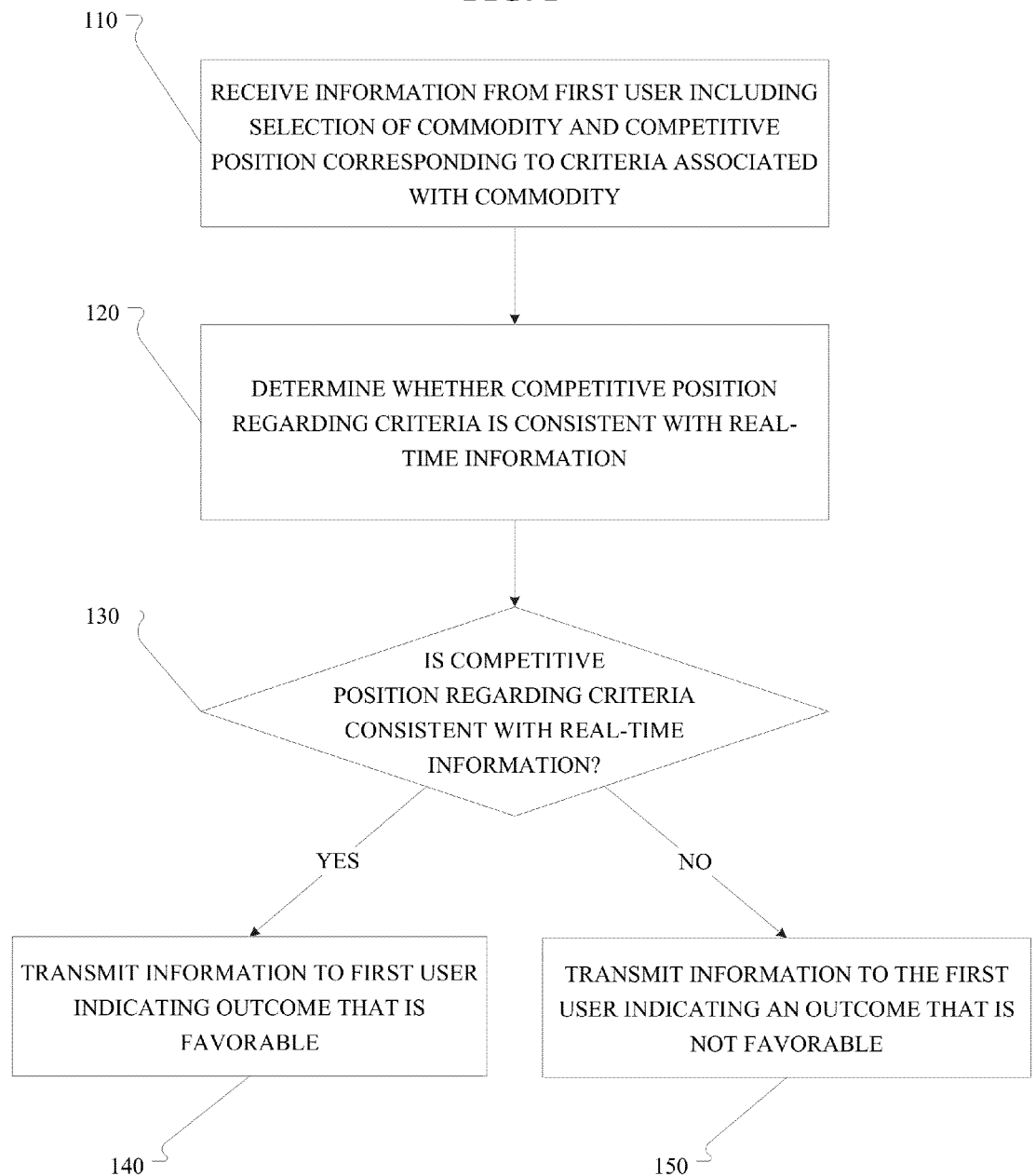

METHOD, APPARATUS, AND COMPUTER-READABLE MEDIA FOR ENABLING REAL-TIME COMPETITION BASED ON LIVE EVENTS

RELATED APPLICATION DATA

This application is a Continuation-in-Part of U.S. patent application Ser. No. 14/257,984, filed Apr. 21, 2014, which is a Continuation of U.S. patent application Ser. No. 13/894,037, filed May 14, 2013, now U.S. Pat. No. 8,727,868, which claimed priority to U.S. Provisional Patent Application No. 61/789,843, filed Mar. 15, 2013, the entire contents of all of which are included herein by reference in their entireties.

This application is also a Continuation-in-Part of U.S. patent application Ser. No. 14/257,985, filed Apr. 21, 2014, which is a Continuation of U.S. patent application Ser. No. 13/899,569, filed May 22, 2013, now U.S. Pat. No. 8,727,869, which claimed priority to U.S. Provisional Patent Application Nos. 61/810,582, filed Apr. 10, 2013, 61/812,719, filed Apr. 16, 2013, and 61/815,112, filed Apr. 23, 2013, the entire contents of all of which are included herein by reference in their entireties.

This application further claims priority to U.S. Provisional Patent Application No. 61/847,062, filed Jul. 16, 2013, the entire contents of which is included herein by reference in its entirety.

FIELD OF THE INVENTION

The disclosed embodiment relates to methods, apparatus, and computer-readable media for enabling real-time competition based on commodities.

SUMMARY

The disclosed embodiment relates to methods, apparatus, and computer-readable media for enabling real-time competition based on a commodity. An exemplary computer-implemented method comprises receiving information corresponding to a selection of a commodity and a competitive position associated with the commodity, the competitive position being based on the value of the commodity over a specified duration of time, transmitting information to a computing device associated with the user for display as an entertaining experience during the specified duration of time, the entertaining experience including a real-time state of the competitive position relative to the real-time value of the commodity, and transmitting, after the specified duration of time has ended, outcome information to the computing device associated with the user, the outcome information indicating whether the real-time data at the end of the specified duration of time was consistent with the competitive position.

An alternative method comprises transmitting information corresponding to a selection of a commodity and a competitive position associated with the commodity, the competitive position being based on the value of the commodity over a specified duration of time, receiving information for display as an entertaining experience during the specified duration of time, the entertaining experience including a real-time state of the competitive position relative to the real-time value of the commodity, and receiving, after the specified duration of time has ended, outcome information indicating whether the real-time data at the end of the specified duration of time was consistent with the competitive position.

The real-time state is preferably selected from a first state in which the competitive position is consistent with the real-time value of the commodity and a second state in which the competitive position is not consistent with the real-time value of the commodity, and may be updated periodically during the specified period of time based on whether the real-time value of the commodity is consistent with the competitive position. The real-time state is also preferably obtained from a live feed.

The specified duration of time is preferably a fixed time interval having a start time and an end time, and the competitive position is preferably based on whether the value of the commodity will rise, fall, or remain the same over the specified duration of time. Information may also be received corresponding to a wager associated with the competitive position.

The entertaining experience may be presented in any form, such as a virtual sporting event, a virtual casino game, and the like. The entertaining experience may also include digital playing cards or coins that represent the commodity.

The disclosed embodiment also relates to apparatus for enabling real-time competition based on commodities. An exemplary apparatus comprises one or more processors, and one or more memories operatively coupled to at least one of the one or more processors and having instructions stored thereon that, when executed by at least one of the one or more processors, cause at least one of the one or more processors to carry out one or more of the methods according to the disclosed embodiment.

The disclosed embodiment further relates to at least one non-transitory computer-readable medium storing computer-readable instructions that, when executed by one or more computing devices, cause at least one of the one or more computing devices to carry out one or more of the methods according to the disclosed embodiment.

BRIEF DESCRIPTION OF THE DRAWINGS

The disclosed embodiment relates to methods, apparatus, and computer-readable media for enabling real-time competition based on commodities.

FIG. 1 illustrates an exemplary method enabling real-time competition according to the disclosed embodiment.

FIGS. 4A-D illustrate exemplary selection grids according to the disclosed embodiment.

DETAILED DESCRIPTION

Figure 2A:
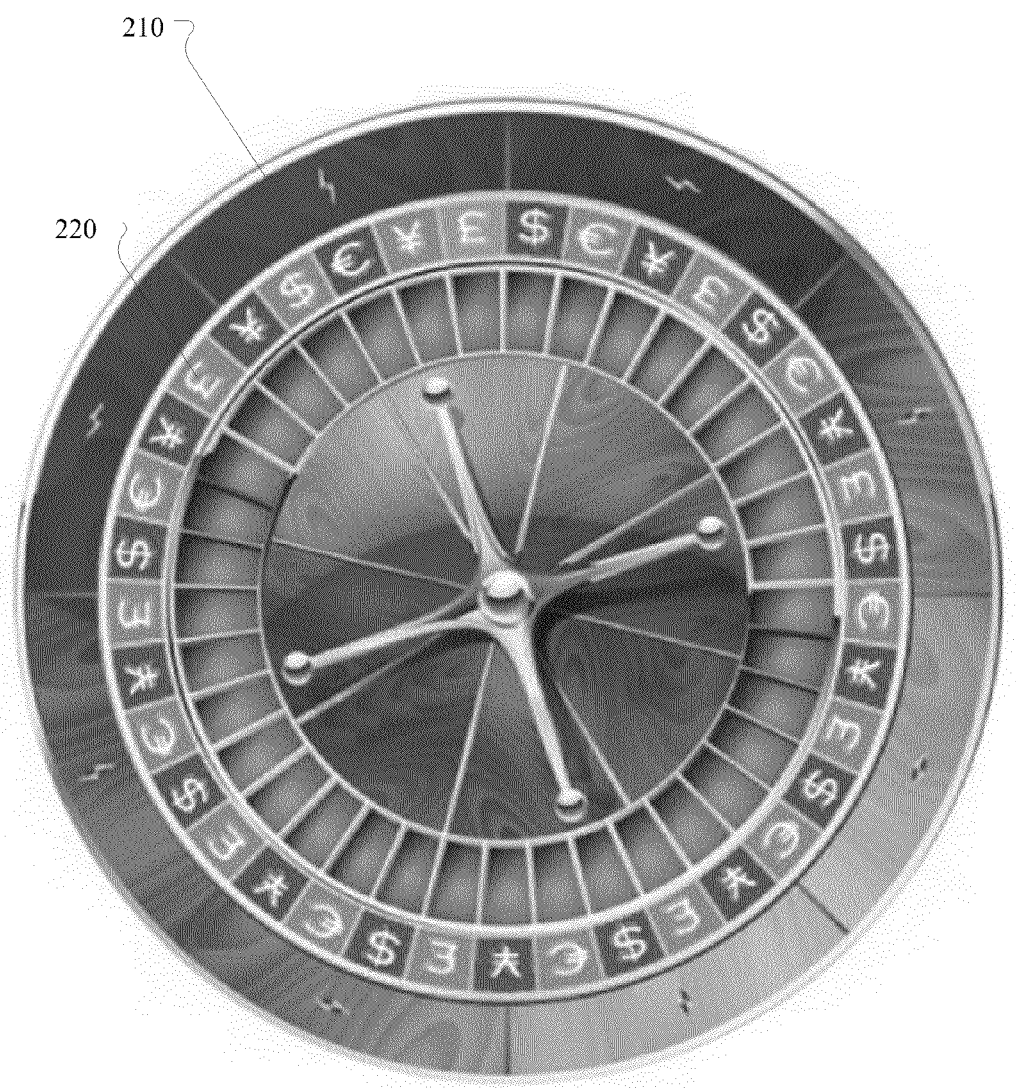
FIGS. 2A and 2B illustrate exemplary virtual roulette wheels according to the disclosed embodiment.

The disclosed embodiment relates to methods, apparatus, and computer-readable media for enabling real-time competition based on commodities. The disclosed embodiments offer fun seeking financial players the ability to place real or virtual money wagers on real-time or future currency/commodity price fluctuations, within a social, entertaining and competitive gaming environment. By integrating casino-style and peer-to-peer financial gaming models with the traditional binary betting product, the disclosed embodiments provide an innovative and unique multi-platform gaming destination for the financial betting community. Related U.S. Pat. Nos. 8,727,868 and 8,727,869 describe similar real-time competitions; their disclosures are hereby incorporated by reference in their entireties.

Commodities, as used herein, includes, for example, all types of global currencies, hard commodities such as precious metals and/or other metals (i.e. silver, gold, nickel, platinum, iron, steel, aluminum, copper, palladium, etc.), soft commodities such as agricultural products (i.e. cotton, wheat, corn, sugar, salt, rice, soybeans, coffee, rubber, livestock, etc.), energy commodities (i.e. electricity, crude and/or Brent oil, natural gas, coal, etc.), precious/semi precious gemstones, and the like. Essentially, anything that can change in value or be traded can be categorized as a commodity herein. Commodities as used herein can also include events such as natural events (i.e. weather prediction, periodic rainfall or lack thereof, storm prediction, earthquakes, hurricanes, tornados, floods, tsunamis, etc.) and financial fluctuations (i.e. stocks and/or shares in any stock market or regional economy (i.e. global stock markets, future markets, AIM Listed companies, etc.), real estate and/or property values, country or regional tax rates, interest rates, gross domestic product or any country, etc.). For each competitive area, criteria can include, as appropriate, commodities rising in value, falling in value, or holding a current value. In addition, criteria can relate to odds associated with one or more competitive positions.

The real-time competitions and entertaining experiences described herein allow users to compete in an entertaining fashion using game engines and platforms. The game engines preferably integrate real time data from market data feeds (currencies, commodities and indices) as the basis for determining the real-time states during the competitions as well as the final outcomes after the competition periods are over. The entertaining experiences preferably includes many social features such as in game chat, leaderboards, social network integrations, and the like.

According to the disclosed embodiment, one or more users may compete either against other users or against a non-user entity in a real-time event. In an exemplary scenario, users can challenge other users or a non-user entity to competitions based on fluctuations (i.e. rise, fall, stay) in the values of one or more commodities. Each user can then experience the competition in real-time through a user interface on a computing device associated with that user. For example, the competition may be presented to each user as a game of chance, including, for example, roulette, slots, and the like, with the outcome of the game being determined by the results of the fluctuations in the values of the one or more commodities. Fluctuations in the values of the commodities may be determined based on a global market perspective or relative to the value of one or more other commodities. For example, the competition may be based on fluctuations of the value of the currency of one country or region relative to the value of the currency of another country or region.

As an example, a user may choose a competitive position in which the value of the U.S. Dollar rises over a specified period of time. After the choice is made, the competition begins (i.e. roulette wheel spins, slots move, etc.). The result of the competition will indicate whether the value of the U.S. Dollar rises, and if so, the user wins. In the roulette example, the user wins if the ball lands in a slot reflecting the rise in the value of the U.S. dollar. In the slots example, the slots may stop on a jackpot result with one or more dollar signs reflecting the rise in the value of the U.S. Dollar. The competition may be based on any time period, such as a day of financial trading, with the game being decided when the financial market in a specific country or region closes for the day.

The competitive positions of each user are preferably compared with information regarding the real-time event, for example, from a live feed or other data source. During the course of the competition, which may have any suitable duration, the results of the comparisons between the live feed and the competitive positions of the different users can be displayed in real-time as a real-time state to provide the users with their current standings relative to each other user, and can also provide the final outcome of the competition at the conclusion of the competition. The real-time state can include a variety of different states depending on how the competitive positions of each user relate to the real-time data associated with the commodity. The duration of each competition may vary greatly, with exemplary durations being based on set periods of time, or any other duration.

More specifically, as shown in FIG. 1, an exemplary method of the disclosed embodiment enables real-time competition based on commodities. This method may be executed by any suitable computing device or computing devices, including, for example, servers or other centralized computing devices, user computing devices, and the like. In step 110, information is received from a first user or user device including a selection of a commodity and a competitive position corresponding to a criteria associated with the commodity. For example, a user may select the commodity gold, and the criteria may be the fluctuations in the global market over a time period of one hour. The competitive position may be that the value of gold will increase over the selected period of time. In step 120, it is determined, based at least in part on real-time information regarding the selected commodity, whether the competitive position regarding the criteria is consistent with the real-time information (i.e. did the value of gold rise over the selected period of time?). Decision step 130 reflects the outcome of this determination. If the competitive position regarding the criteria is consistent with the real-time information (i.e. the value of gold did in fact rise), information is transmitted to the first user indicating an outcome that is favorable in step 140. If the competitive position regarding the criteria is not consistent with the real-time information (i.e. the value of gold did not in fact rise), information is transmitted to the first user indicating an outcome that is not favorable in step 150.

In addition, the disclosed embodiment allows for the participation in more than one user or player in the real-time competition. For example, a second user may compete with the first user. In this scenario, using the above example, information is received from a second user including a second competitive position corresponding to the criteria associated with the commodity (i.e. the value of gold will fall over the selected period of time.). A determination is made, once again based at least in part on real-time information regarding the selected commodity, whether the second competitive position regarding the criteria is consistent with the real-time information. If the competitive position regarding the criteria is consistent with the real-time information (i.e. the value of gold did in fact fall), information is transmitted to the second user indicating an outcome that is favorable. If the competitive position regarding the criteria is not consistent with the real-time information (i.e. the value of gold did not in fact fall), information is transmitted to the second user indicating an outcome that is not favorable.

Thus, when more than one user participates, and there are variations in the competitive positions of the users, there will likely be one user that received a favorable outcome (i.e. the winner), and one user that received an outcome that is not favorable (i.e. the loser).

Another aspect of the disclosed embodiment enables users to place wagers based on the real-time competitions, with the winner of the competition being rewarded with winnings based on the wagers. In addition, one or more users may select criteria associated with odds associated with their wager, thereby increasing or decreasing the stakes associated with their wager. The wagers as described herein may be real-world wagers using real funds or may instead be made using virtual currencies.

There are also many variations of the real-time competitions of the disclosed embodiment, and the rules associated with the competitions can easily be modified to provide a wide range of competitions. This will allow the competitions to appeal to a wide range of players. Two examples include Turn Play (i.e. Each round can be as short as 2 minutes or as long as a week. This allows casual competition between long distance friends who play one round each day during lunch to hard core players who play 2 minute round speed competitions.) and Tournaments (i.e. Special events can created with playoff style tournaments. Players enter the field and compete to be the ultimate champion.).

The methods of the disclosed embodiment also enable a competition host, such as a centralized server or the like, to retain a percentage of the wagers as a fee for hosting and/or participating in the competition. Cheating can also be prevented by requiring advance payment of each wager, for example.

The disclosed embodiment further relates to collecting player data and play patterns for future use, such as targeted advertisements and other platform offerings, and to improve the platform experience to increase customer satisfaction. Periodic reports can also be generated based on player activity. Live summary dashboards may also be utilized to display activity.

Entertaining Displays

As described herein, the outcome may be displayed to one or more users as entertaining experiences on their respective computing devices, on computing devices viewed by multiple players, and the like. Exemplary displays include a virtual roulette wheel, a virtual slots machine, and the like. These displays can also be used as an interface to allow users to make their selections regarding commodities, criteria, competitive positions, and the like. The examples described herein and illustrated in the figures represent exemplary entertaining experiences.

Roulette Wheel

Figure 2B:
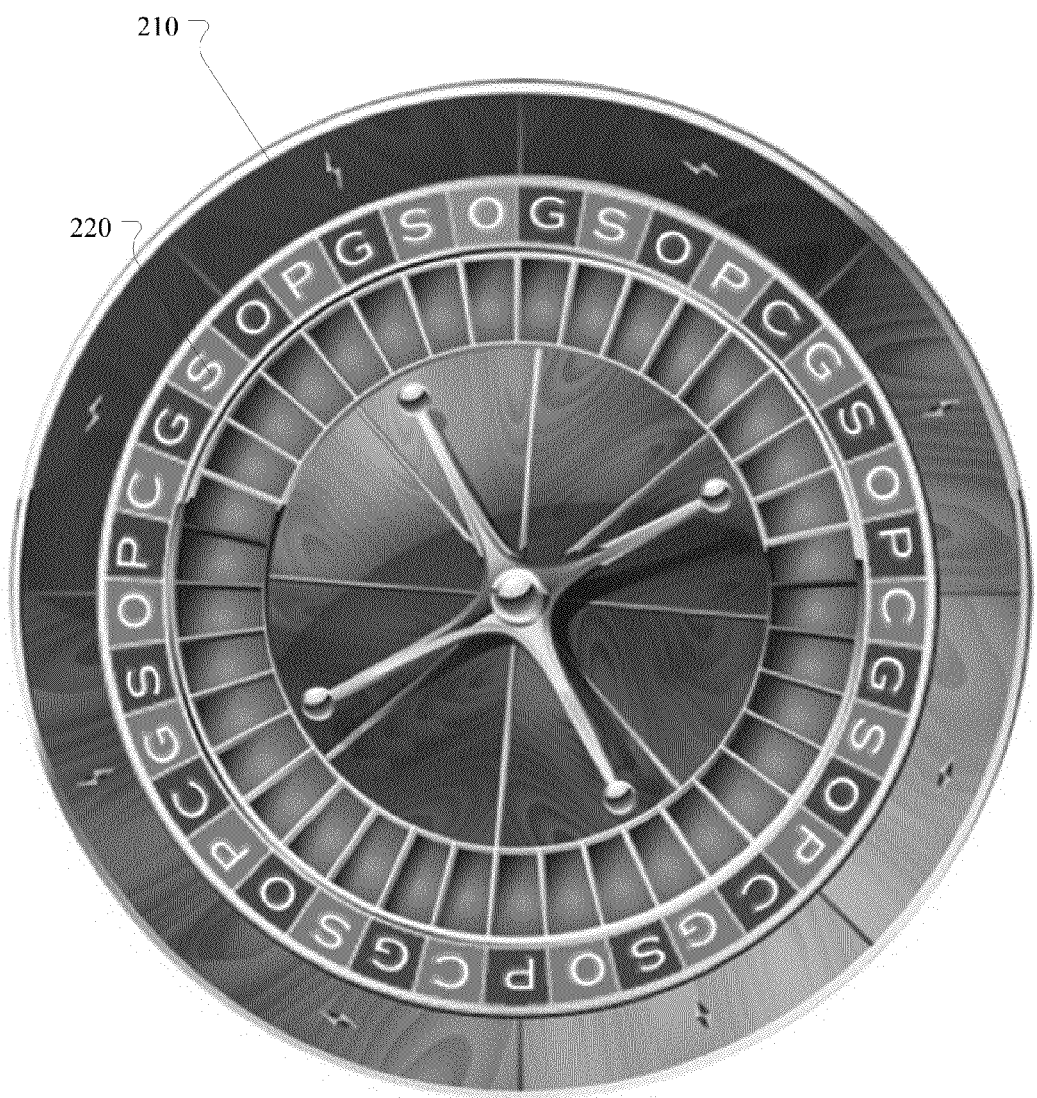

As indicated above, and as shown in FIGS. 2A and 2B, the competition may be displayed as a roulette wheel 210 with commodity symbols 220 (i.e. currency symbols, etc.) instead of numbers around the wheel. Any number of symbols or other variables may be used. Players can make their selections by choice, or make random selections, and may place wagers associated with their selections. After the competition begins, one or more balls or other objects may be spun around the wheel and come to rest at the conclusion of the competition in slots corresponding to the commodities.

Figure 3:
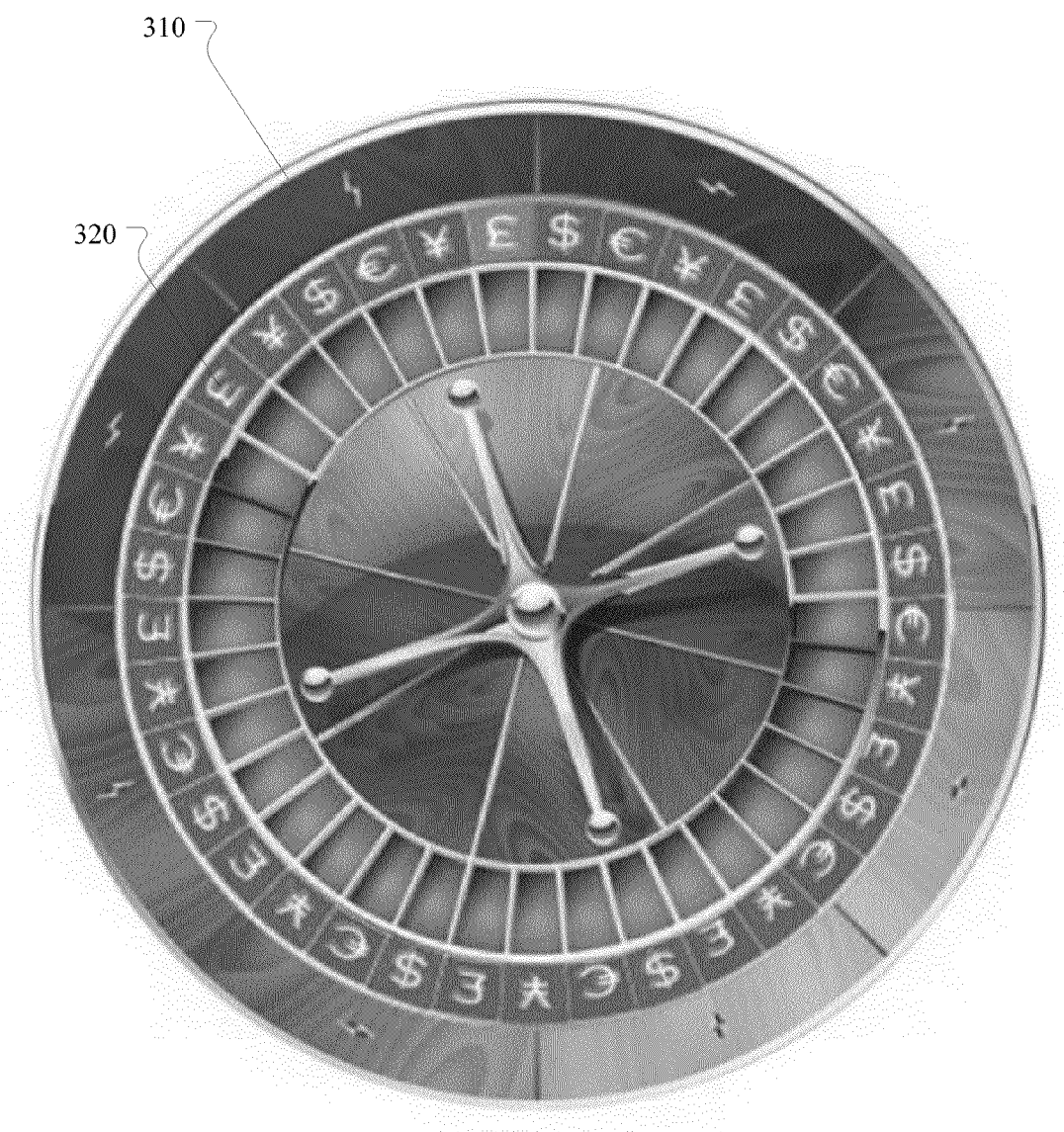
FIG. 3 illustrates an exemplary virtual roulette wheel according to the disclosed embodiment.
Figures 4A, 4B:
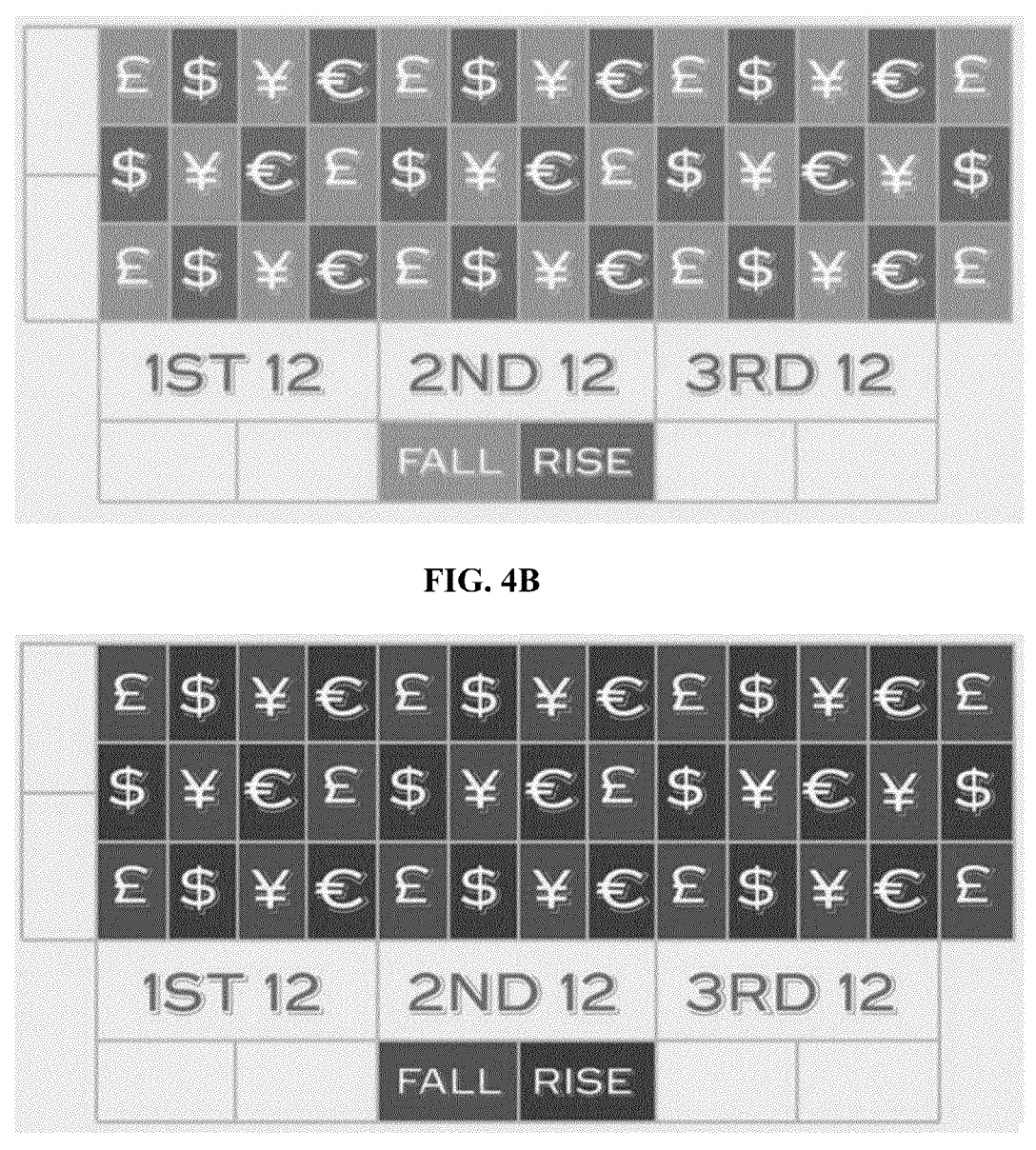
Figures 4C, 4D:
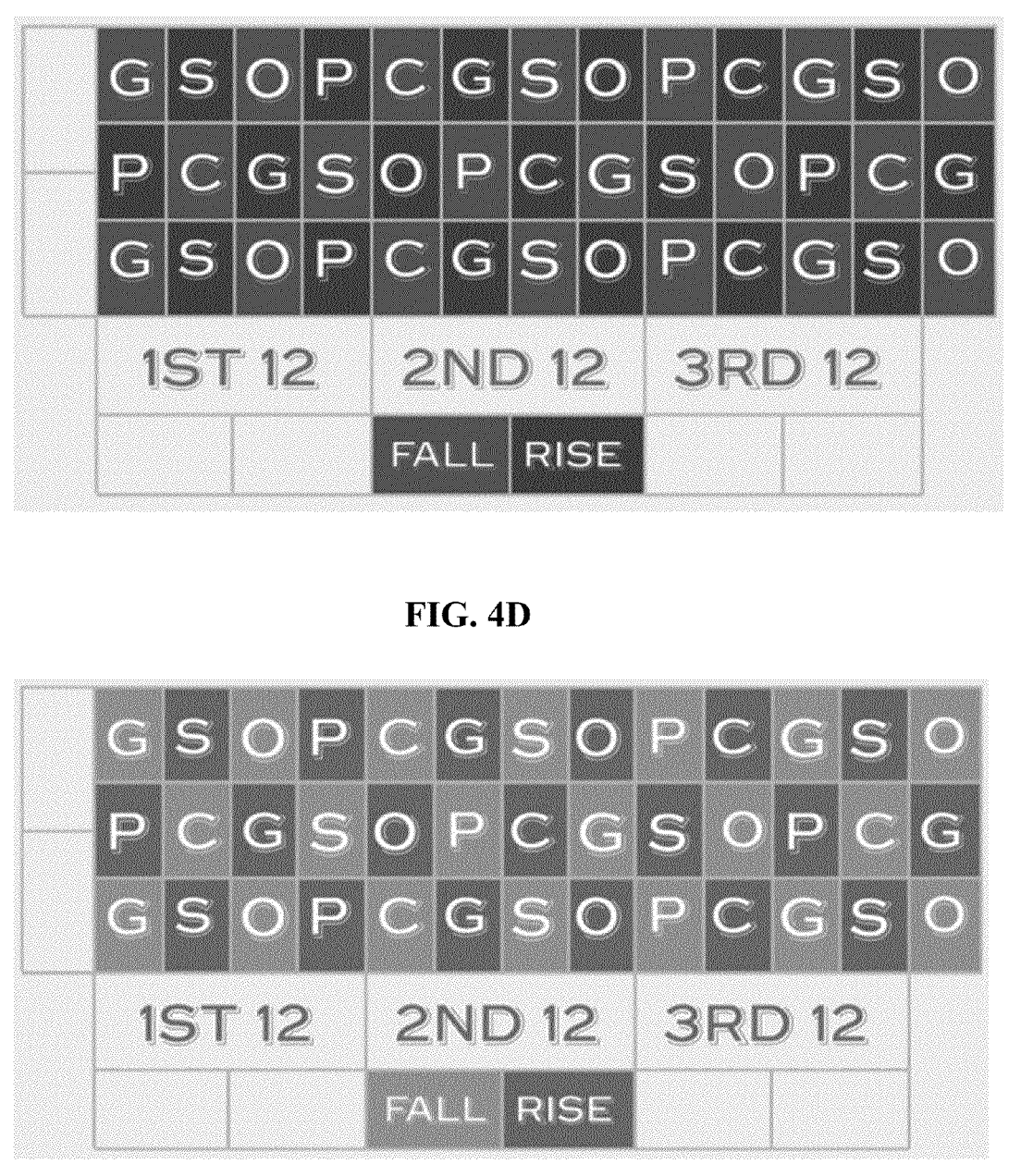

Wagers can be on for example but not limited to, which currency will Rise or Fall over the spin of the wheel, this can be determined by a live feed to the foreign exchange market, for example. FIG. 3 illustrates an exemplary roulette wheel 310 with variations in the positions on the wheel to indicate competitive positions 320 regarding each commodity. Selections can also be made using selection grids, such as those shown in FIGS. 4A-4D.

Wagers can also be placed on peer to peer or multiple players bets against the house or operator, for example but not limited to, which currencies will rise, fall, stay the same over the spin of the wheel or fixed amount of time, split wagers can be placed where a player or multiple players bet on one or more currencies rising/falling, staying the same either against another current or in General rising or falling in the market as a whole. In addition, if there are multiple grouped commodities in play (i.e. 24 commodities split into four groups of six), the player or players can place wagers on a particular group of currencies rising of falling over a period of time or spin of the wheel.

For example purposes, the fluctuations of the values of the commodities may be represented using any method, such as by color-coding (i.e. RED for falling currency, Green for Rising currencies, and any other color could be used for non-movement.

In addition to straight selections, a non-player entity or any other player may offer odds against each and all possibilities including but not limited to, Rising/Falling/non movement of any commodity in general, or against another player in particular.

Figure 5A:
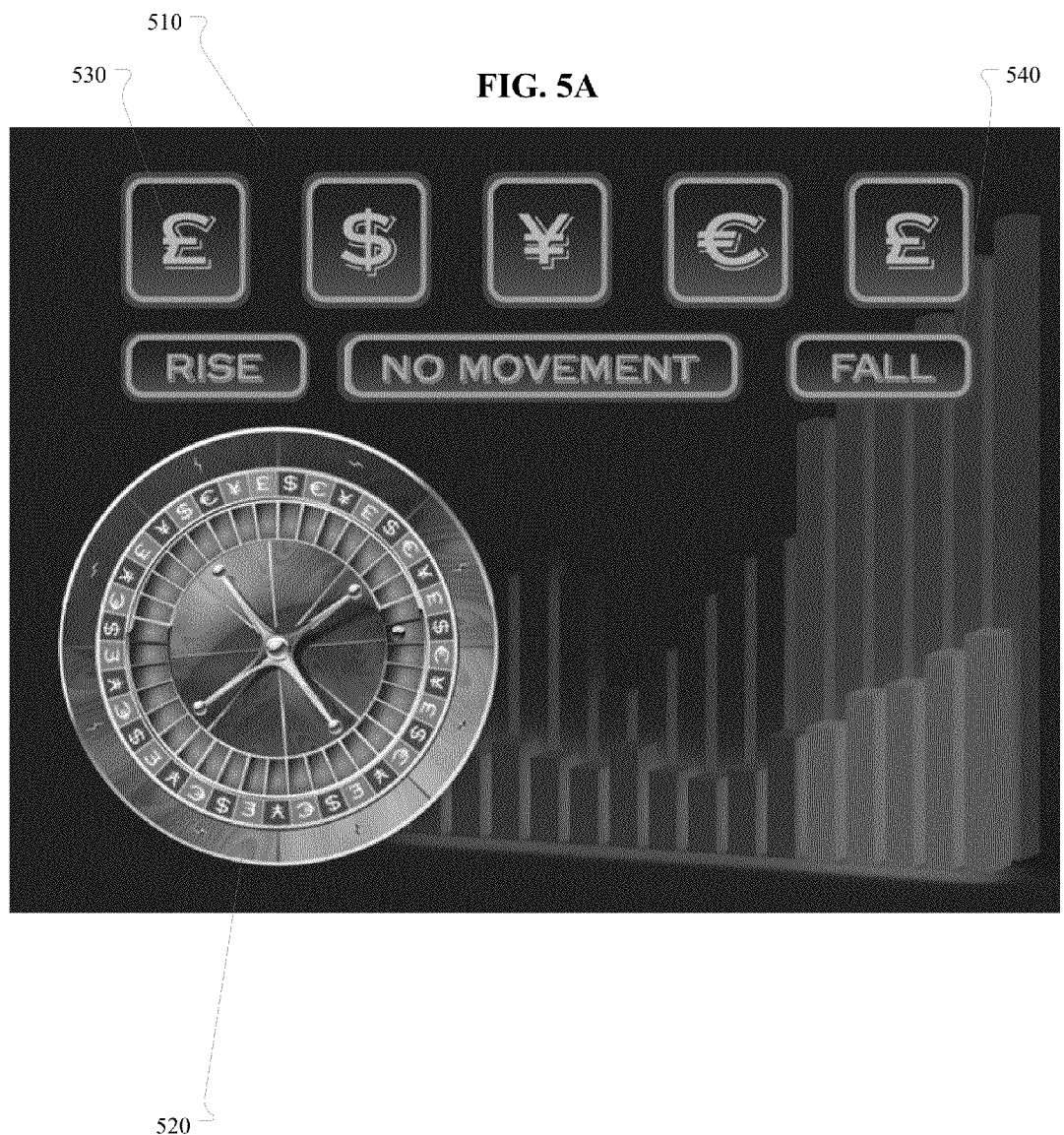
FIGS. 5A-B illustrate exemplary roulette wheel interfaces according to the disclosed embodiment.
Figure 5B:
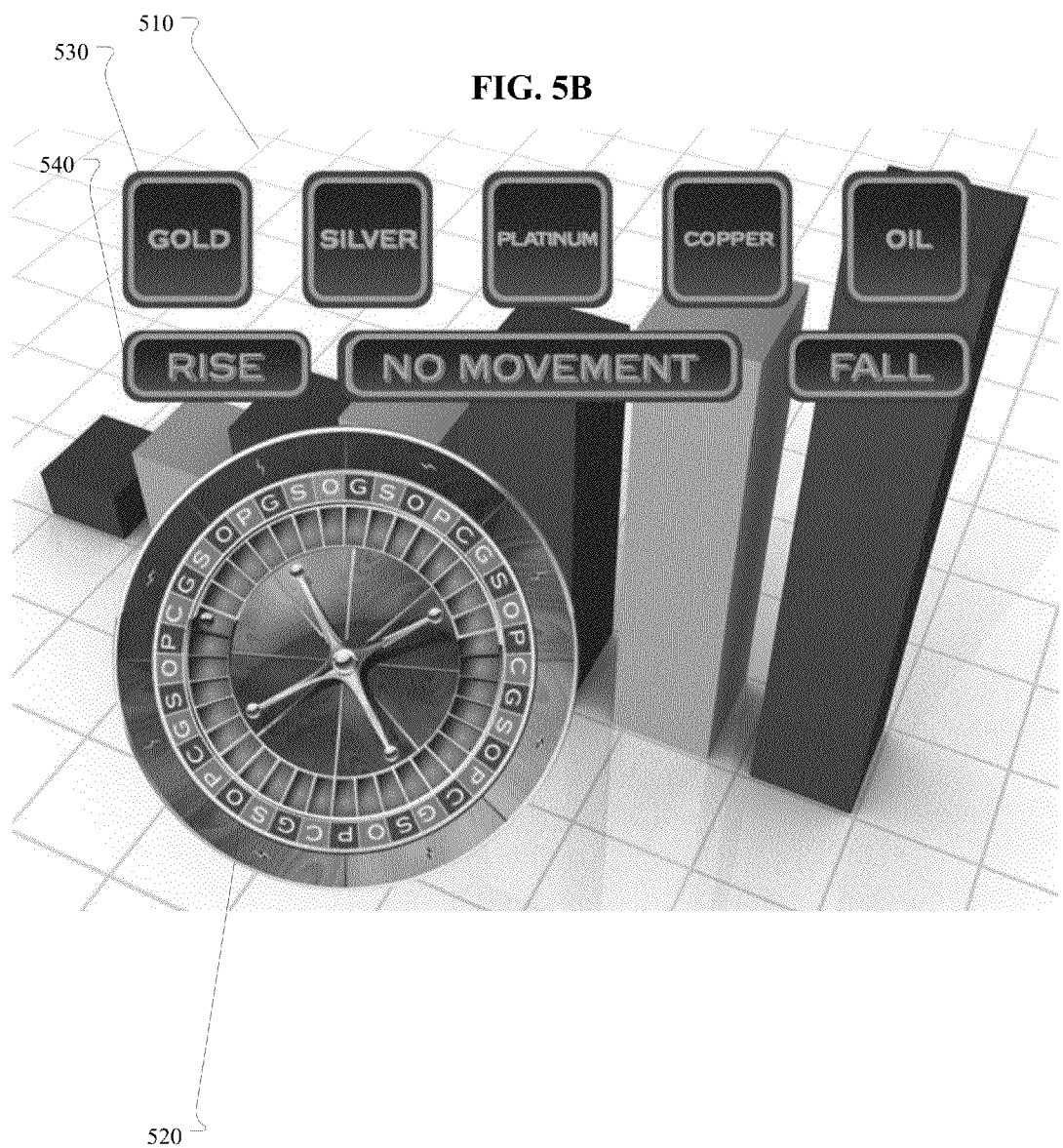

FIGS. 5A and 5B illustrate exemplary interfaces of the roulette wheel example according to the disclosed embodiment. As shown in these figures, the interface 510 may include an image of the roulette wheel 520, buttons or icons 530 that can be selected by a user or users, such as which commodities (i.e. currencies, precious metals, etc.) each user selects, and whether each user selects the selected commodities to rise, fall, or have no movement (540).

Slots

Figure 6A:
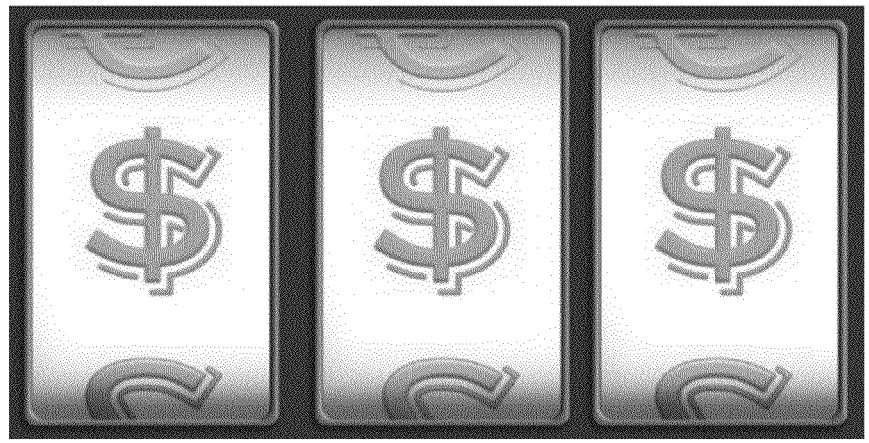
FIGS. 6A-C illustrate exemplary virtual slots machines according to the disclosed embodiment.
Figure 6B:
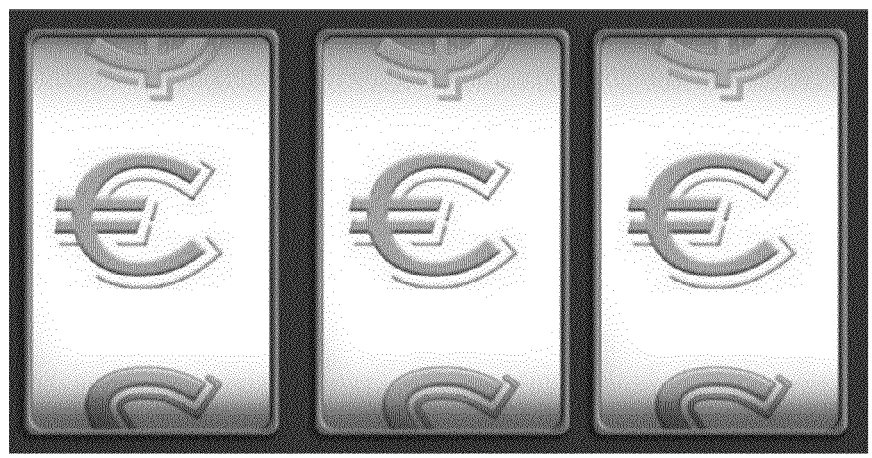
Figure 6C:
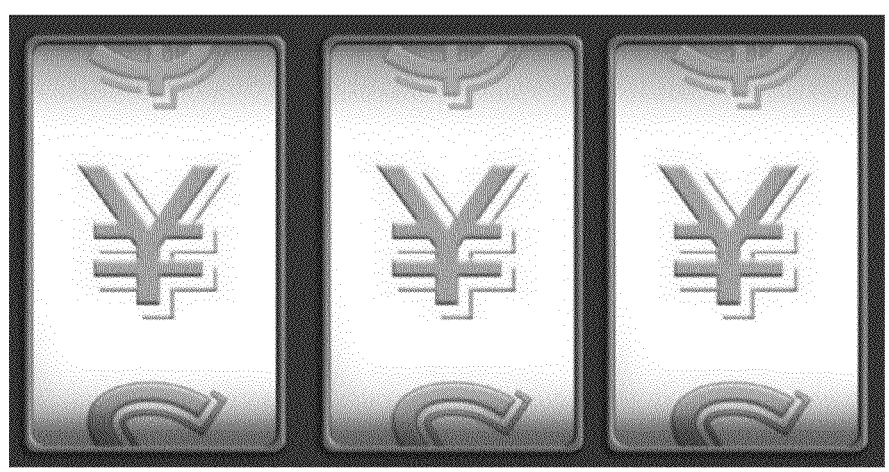
Figure 7A:
FIGS. 7A-G illustrate exemplary slot machine interfaces according to the disclosed embodiment.
Figure 7B:
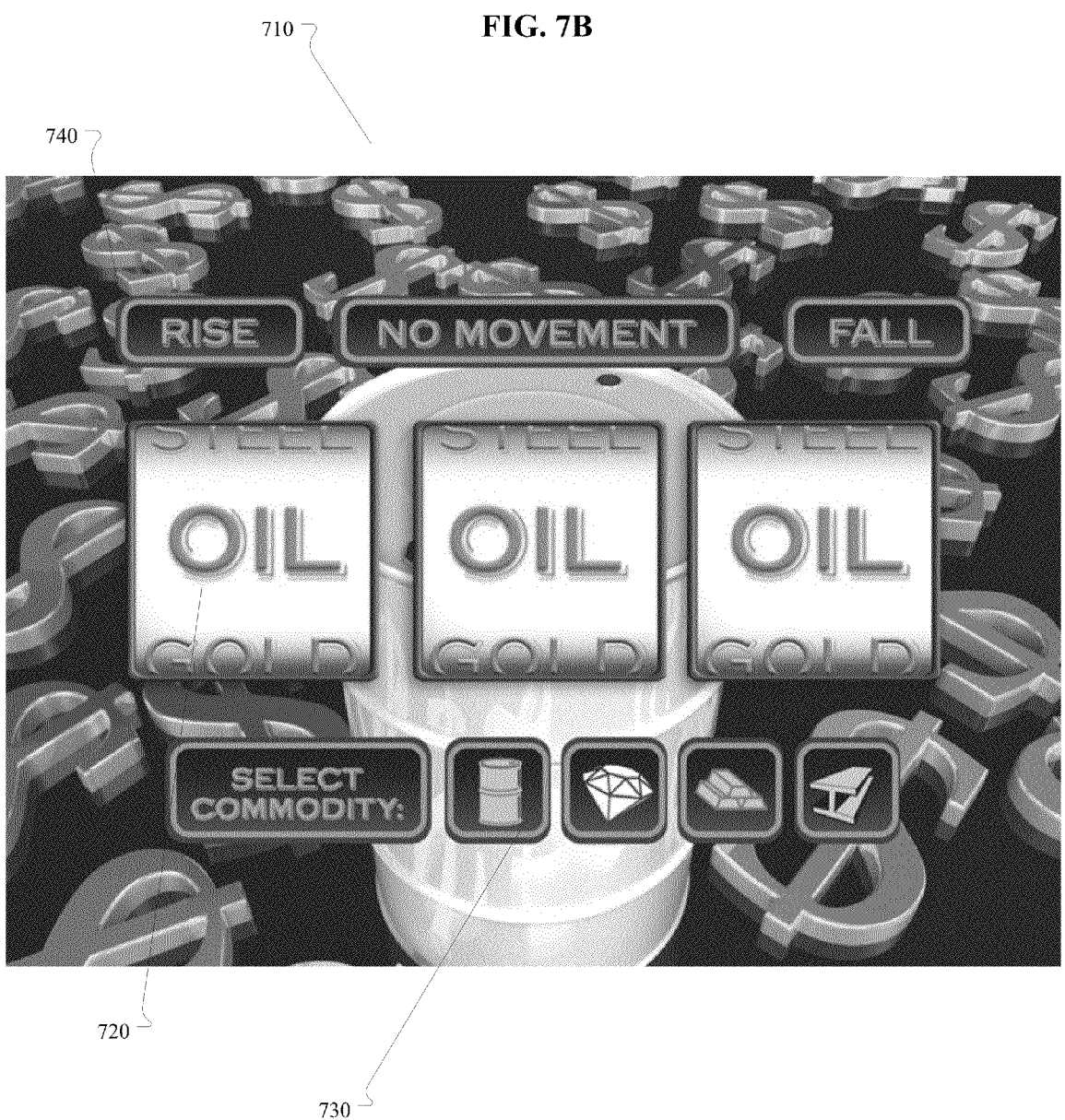
Figure 7C:
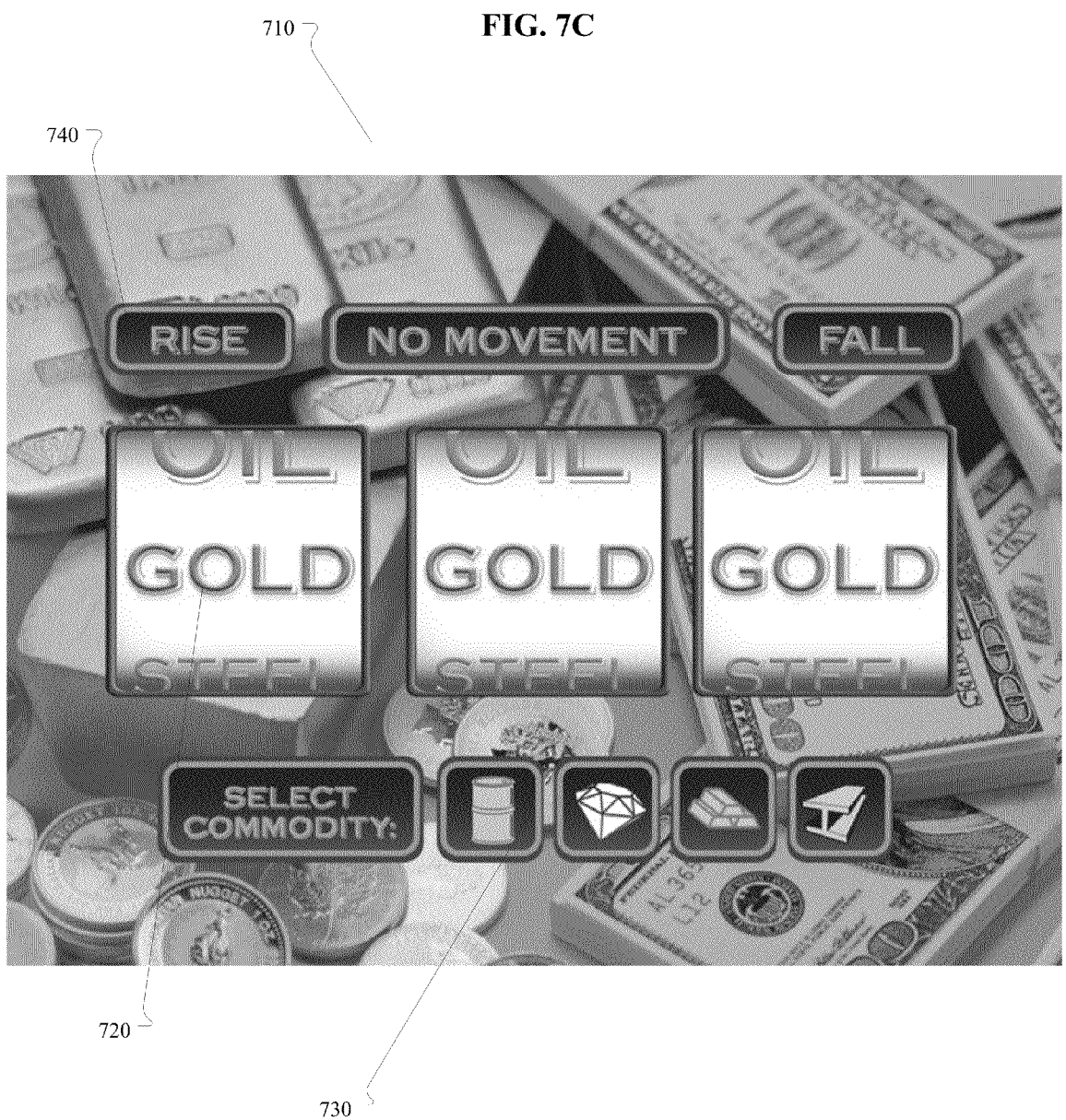
Figure 7D:
Figure 7E:
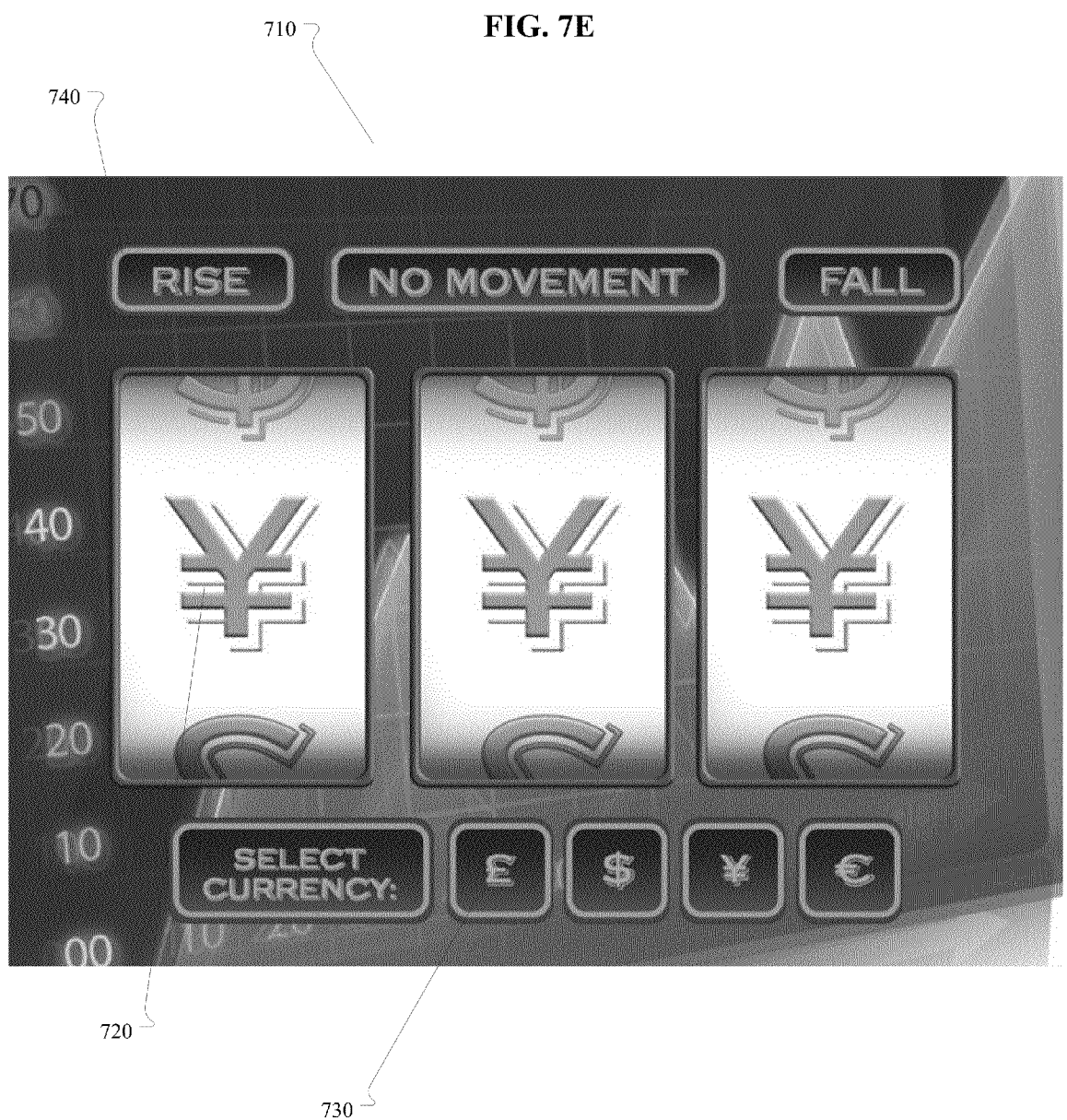
Figure 7F:
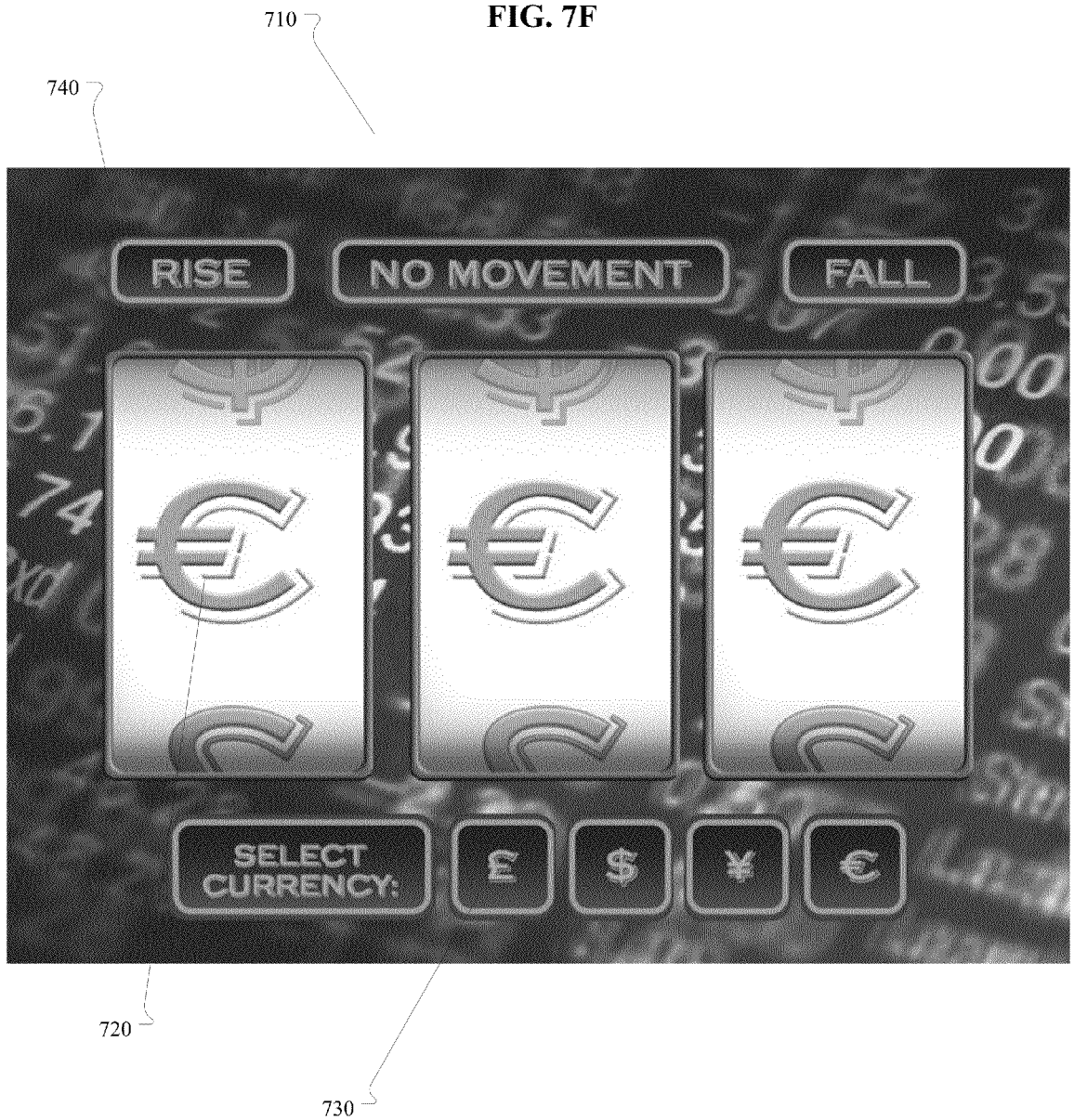
Figure 7G:
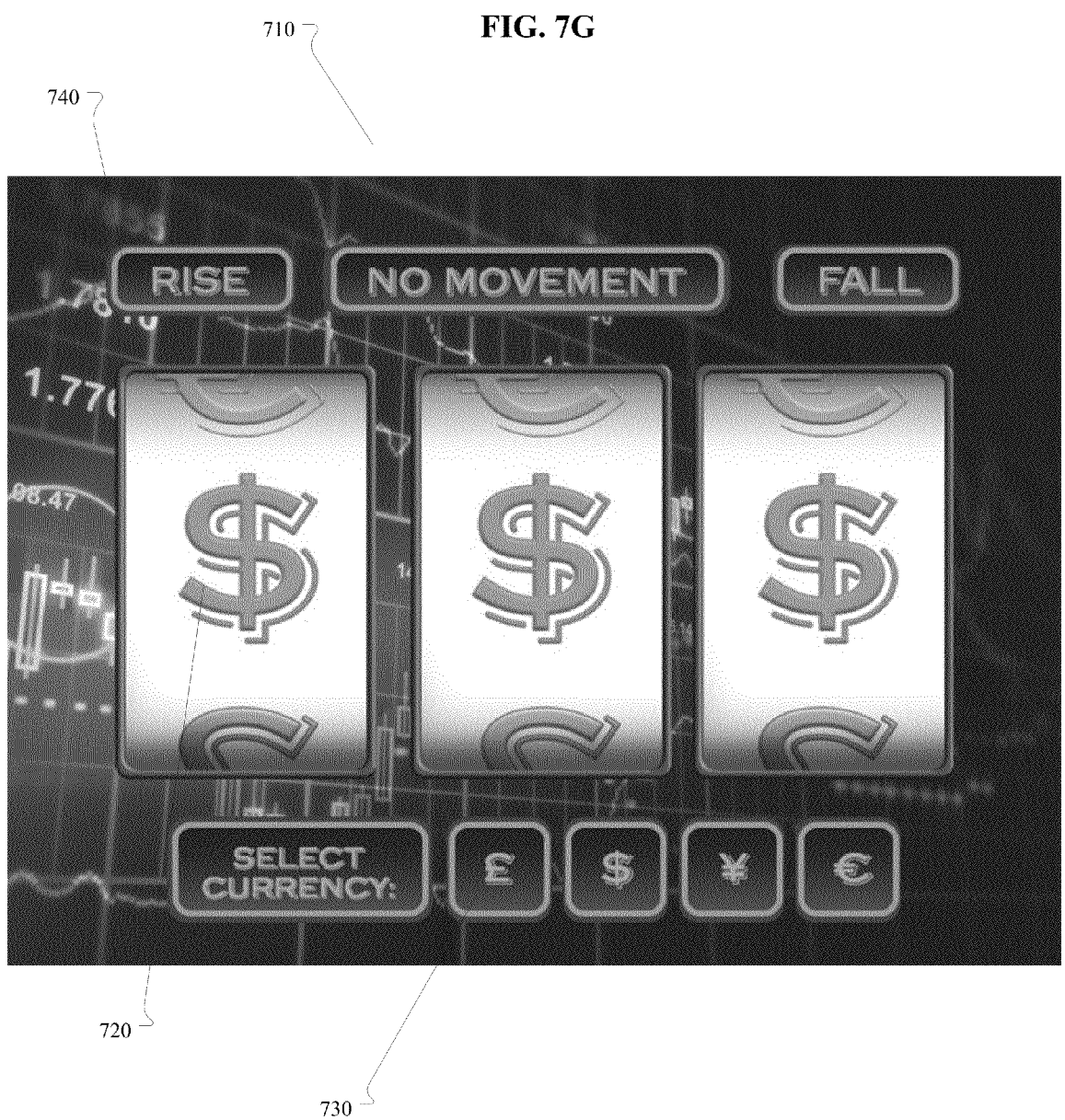

As indicated above, and shown in FIGS. 6A-6C, the competition may be displayed as a slots machine with commodity symbols (i.e. currency symbols, etc.). Any number of symbols or other variables may be used. Players can make their selections by choice, or make random selections, and may place wagers associated with their selections. When the competition begins, the symbols on the slots display may spin until coming to rest on a result reflecting the selected commodities.

Wagers can be on for example but not limited to, which currency will Rise or Fall over the spin of the slots, this can be determined by a live feed to the foreign exchange market, for example. Wagers can also be placed on peer to peer or multiple players bets against the house or operator, for example but not limited to, which currencies will rise, fall, stay the same over the spin of the slots or fixed amount of time, split wagers can be placed where a player or multiple players bet on one or more currencies rising/falling, staying the same either against another current or in General rising or falling in the market as a whole. In addition, if there are multiple grouped commodities in play (i.e. 24 commodities split into four groups of six), the player or players can place wagers on a particular group of currencies rising of falling over a period of time or spin of the slots.

For example purposes, the fluctuations of the values of the commodities may be represented using any method, such as by color-coding (i.e. RED for falling currency, Green for Rising currencies, and any other color could be used for non-movement.

In addition to straight selections, a non-player entity or any other player may offer odds against each and all possibilities including but not limited to, Rising/Falling/non movement of any commodity in general, or against another player in particular.

In addition to the above figures, FIGS. 7A-7G illustrate exemplary interfaces of the slots machine example according to the disclosed embodiment. As shown in these figures, the interface 710 may include a slots display 720, buttons or icons 730 that can be selected by a user or users, such as which commodities (i.e. currencies, precious metals, etc.) each user selects, whether each user selects the selected commodities to rise, fall, or have no movement (740), and in some cases, odds 750 associated with wagers.

In the scenario in which the competitions of the disclosed embodiment are broadcast or displayed to one or more users on televisions or the like, more than one user may view the broadcast. This is especially useful in an environment in which more than one user is watching the same broadcast of a competition, or when users in different locations are watching the same broadcast. When this occurs, the broadcast preferably includes the entire competition, either in a combined display, or in a split-screen or frame structure wherein the competition is displayed from the perspectives of each user. For example, if the competition is broadcast in a restaurant, bar, casino, etc., a single television may display the competition for a plurality of users, and each user would preferably be able to determine, from the broadcast, their current standing in the competition. In addition, using this configuration makes it easy for existing users to leave the competition or new users to join the competition, for example, between rounds of play.

Another aspect of the disclosed embodiment enables users to place wagers based on the fluctuations of the values of the commodities, with the winner of the competition being rewarded with winnings based on the wagers. In addition, one or more users may give odds associated with their wager, thereby increasing or decreasing the stakes associated with their wager. For example, wagers may be based on the rate of growth of a particular commodity, overall growth over a period of time, and the like.

The methods of the disclosed embodiment also enable the game host, such as a gaming server or the like, to retain a percentage of the wagers as a fee for playing the game. Cheating can also be prevented by requiring advance payment of each wager, for example.

The disclosed embodiment further relates to collecting player data and play patterns for future use, such as targeted advertisements and other platform offerings, and to improve the platform experience to increase customer satisfaction.

Figure 8:
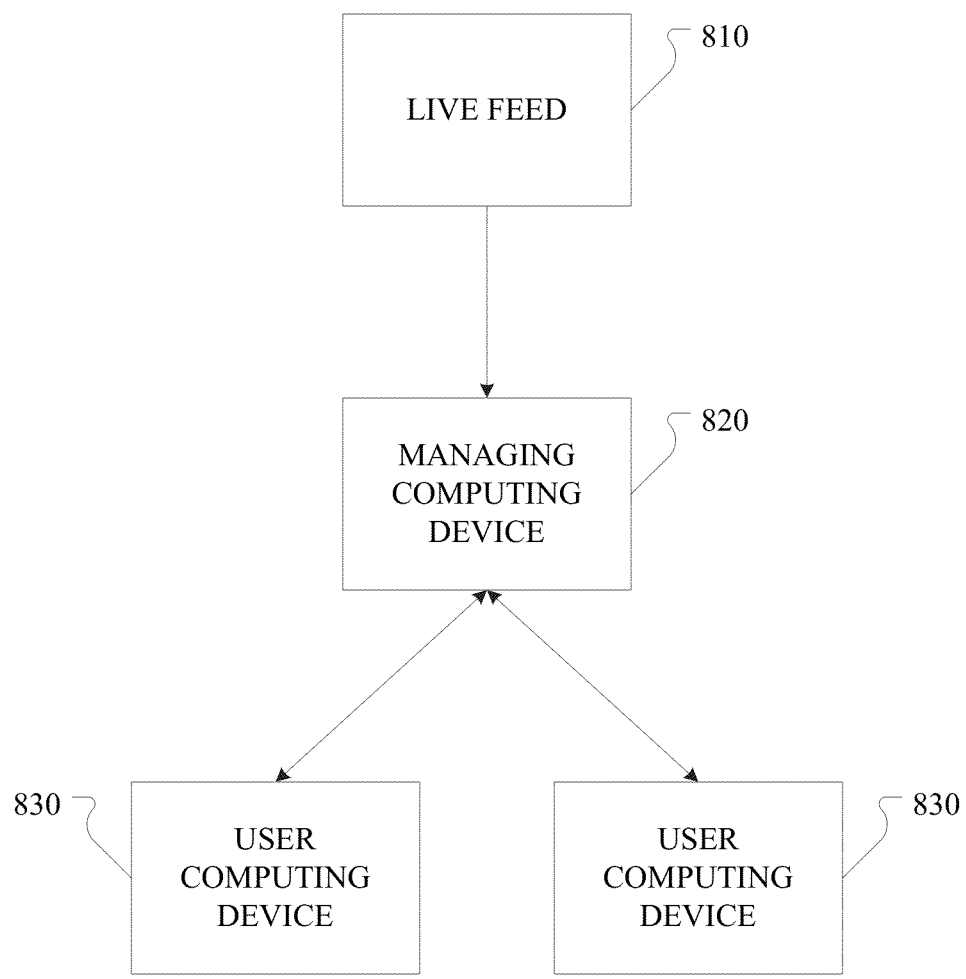
FIG. 8 illustrates an exemplary arrangement according to the disclosed embodiment in which competitions are managed by one or more managing computing devices.

As described herein, and shown in FIG. 8 below, the competitions may be managed by one or more managing computing devices 820, such as a server and the like, with data being transmitted back and forth between user computing devices 830 and managing computing devices 820, as needed, to enable the real-time competitions of the disclosed embodiment. In this configuration, a live feed 810 preferably provides information associated with the commodities to managing computing devices 820, which in turn, transmits the information, as appropriate, to the user computing devices 830.

Figure 9:
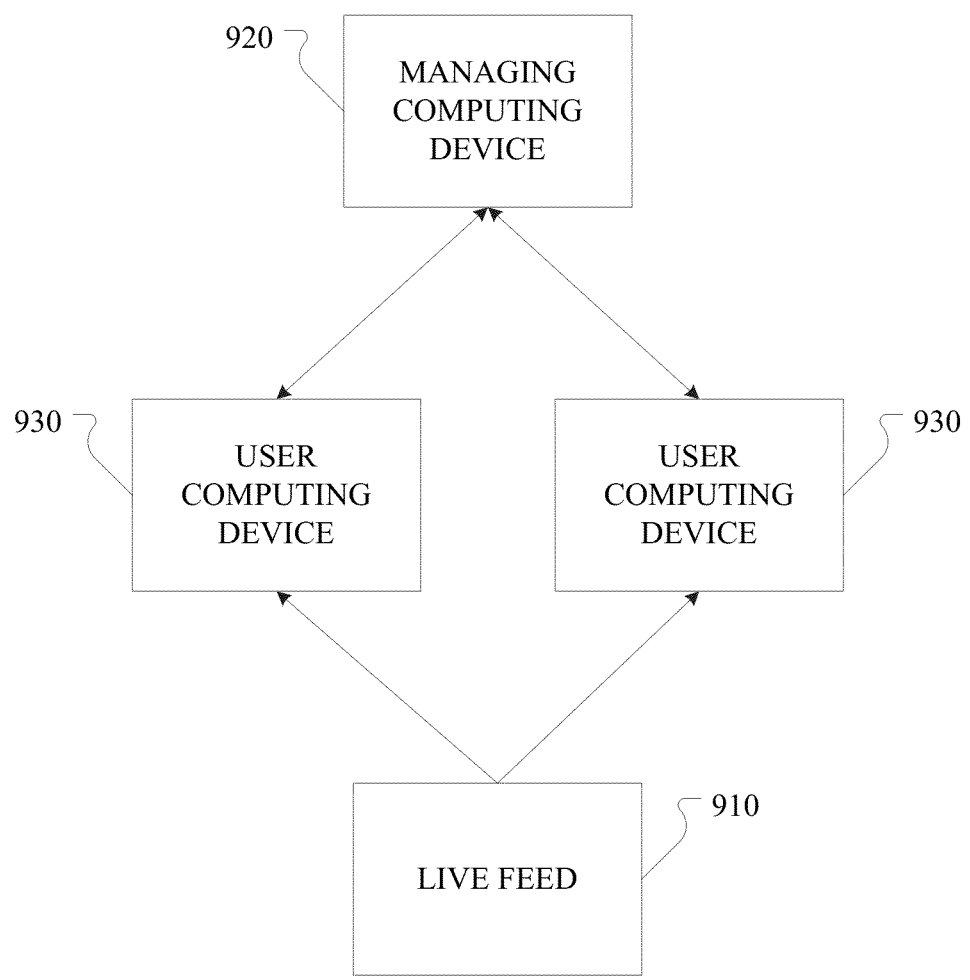
FIG. 9 illustrates an exemplary arrangement according to the disclosed embodiment in which competitions are managed by one or more managing computing devices.

In an alternative configuration shown in FIG. 9 below, the competitions may be managed by one or more managing computing devices 920, such as a server and the like, with data being transmitted back and forth between user computing devices 930 and managing computing devices 920, as needed, to enable the real-time competitions of the disclosed embodiment. In this configuration, a live feed 910 preferably provides information associated with the commodities directly to one or more of user computing devices 930, which can, if appropriate, transmit the information to managing computing devices 920.

Figure 10:
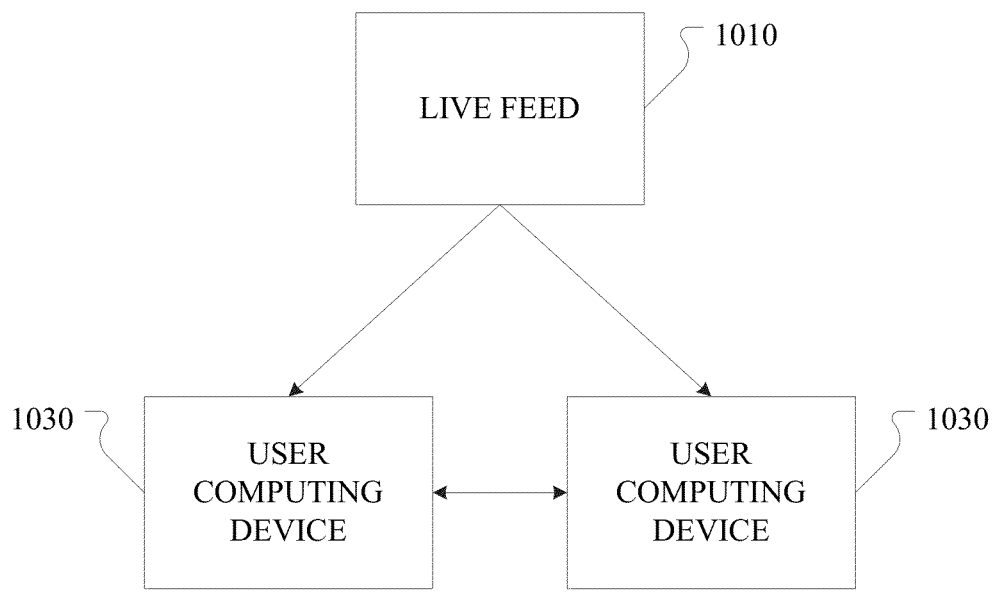
FIG. 10 illustrates an exemplary arrangement according to the disclosed embodiment in which competitions are managed by one or more user computing devices without a managing computing device.

In another alternative configuration shown in FIG. 10 below, the competitions may be managed by one or more of user computing devices 1030 without a managing computing device being required. In this scenario, data can be transmitted back and forth between user computing devices 1030, as needed, to enable the real-time competitions of the disclosed embodiment. In this configuration, a live feed 1010 preferably provides information associated with the commodities directly to one or more of user computing devices 1030.

The following examples illustrate exemplary entertaining experiences in accordance with the disclosed embodiments.

Example 1

Sports Commodity Gambling—Soccer

Figure 11A:
FIGS. 11A-11B illustrate exemplary entertaining experiences displayed as a fast paced penalty shootout themed soccer game according to the disclosed embodiment.
Figure 11B:

As described in this example and shown in FIGS. 11A and 11B, an aspect of the disclosed embodiment relates to a fast paced penalty shootout themed soccer game designed for two players. This competition is preferably played in a series of rounds, and at the start of each round, players place bets on a commodity of their choosing. If a player's bet is successful, that player's team will score a goal. If a player's bet is not successful, that player's team will miss the shot. The competition may be played in a best-of format, for example, best of five. If there is a tie, the competition can go to sudden death.

In more detail, the competition can begin with a player entering a lobby interface and choosing from a wide variety of competition setups. Specifically, each player can choose their commodity, their desired match up, the round time limit, the wager amount, and the like. For Example Player 1 chooses the following:

£VERSUS $
£10 per bet
2:00 minute rounds

When the competition begins, both players will choose which commodity will gain more at the start of each round, and they may have until the round time limit to change their selection. The selection of the commodity by each player may either be secret until the competition begins, or may be displayed to all players. For example:

Player 1 wagers that the pound will gain on the dollar
Player 2 wagers that the dollar will gain on the pound If a player guesses correctly, he sees his team score a goal. If a player guesses incorrectly, he sees his team miss the kick. For example, if the pound gained on the dollar during the round, Player 1 would score a goal, and Player 2 would miss. These real-time states are preferably displayed in real-time during the competition.

Gameplay continues in this fashion until the end of the competition, for example, until one player scores five goals. For example, Player 1 may score five goals in a row and win the competition.

Of course, there are many variations of this type of competition, and the competition rules can easily be modified to provide a wide range of playing. This will allow the competition to appeal to a wide range of players. Two examples include Turn Play (i.e. Each round can be as short as 2 minutes or as long as a week. This allows casual betting between long distance friends who play one round each day during lunch to hard core players who play 2 minute round speed competitions.) and Tournaments (i.e. Special events can created with playoff style tournaments. Players are paired off and compete to be the ultimate champion.). At the conclusion of the competition, the winning player may be rewarded with a payout based on the wagers he placed and/or the rules of the competition.

Example 2

Sports Commodity Gambling—Football

Figure 12A:
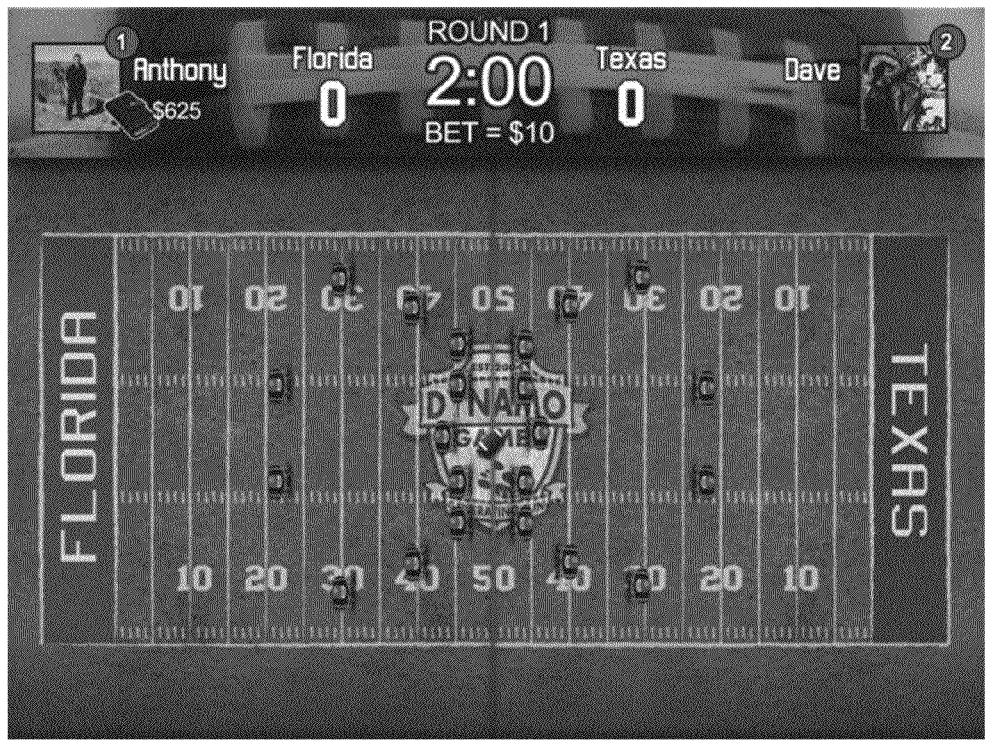
FIGS. 12A-12C illustrate exemplary entertaining experiences displayed as a football game according to the disclosed embodiment.
Figure 12B:
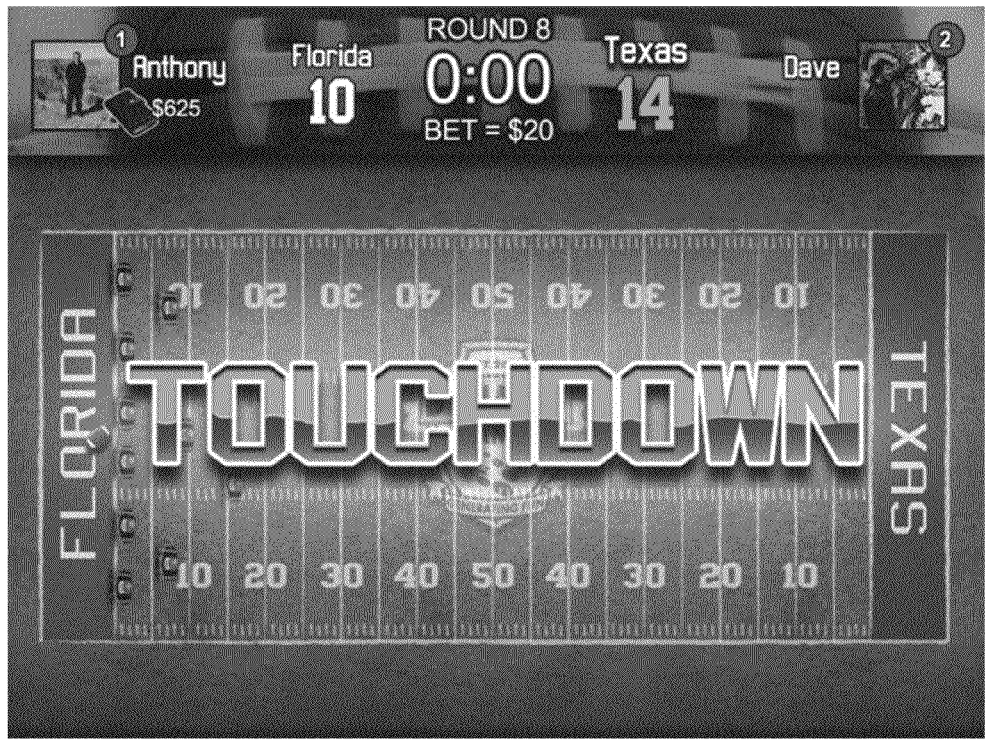
Figure 12C:
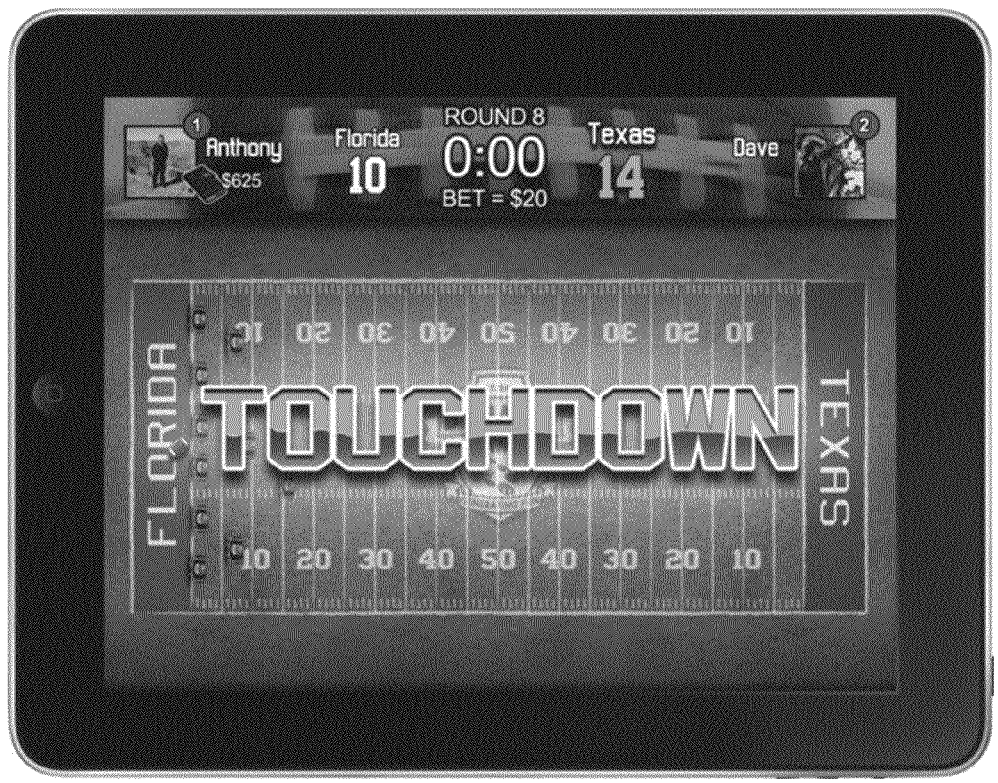

As described in this example and shown in FIGS. 12A, 12B, and 12C, an aspect of the disclosed embodiment relates to a slower paced, wager based simulation of American football designed for two players. Competition begins with the ball placed on the 50 yard line, and the competition is preferably played in a series of rounds. At the start of each round, both players place bets on their chosen commodity. A successful bet results in the ball moving towards the opposing end zone. A failure results a loss yards. A tie results in no change. The first player to move the ball into the opposing end zone scores, and the player with the highest score after the set number of rounds wins. In the event of a tie, the competition goes to sudden death.

In more detail, the competition can begin with a player entering a lobby interface and choosing from a wide variety of competition setups. Specifically, each player can choose their commodity, their desired match up, the round time limit, the wager amount, and the like. For Example Player 1 chooses the following:

$ VERSUS £
$10 per bet
2:00 minute rounds

When the competition begins, both players will choose which commodity will gain more at the star of each round, and they may have until the round time limit to change their selection. The selection of the commodity by each player may either be secret until the competition begins, or may be displayed to all players. For example:

Player 1 wagers that the dollar will gain on the pound
Player 2 wagers that the pound will gain on the dollar If a player guesses correctly and his opponent guesses incorrectly, the team associated with the correct player moves the ball forward 10 yards. If both players guess correctly or incorrectly, the ball does not move. These real-time states are preferably displayed in real-time during the competition. The ball can go back and forth until one team pushes the ball into the opposing end zone, scoring a touchdown. For example, if the dollar gained on the pound, Player 1's team would move the ball forward 10 yards, and Player 2's team would surrender 10 yards to his opponent.

Gameplay continues in this fashion until the end of the competition, for example, until the round limit or score limit has been reached. For example, after 20 rounds of play, Player 1 wins the competition by a score of 14 to 12.

Of course, there are many variations of this type of competition, and the competition rules can easily be modified to provide a wide range of playing. Two example include Turn Play (i.e. Each round can be as short as 2 minutes or as long as a week. This allows casual betting between long distance friends who play one round each day during lunch to hard core players who play 2 minute round speed competitions.) and Tournaments (Special events can created with playoff style tournaments. Players are paired off and compete to be the ultimate champion.). At the conclusion of the competition, the winning player may be rewarded with a payout based on the wagers he placed and/or the rules of the competition.

Example 3

Sports Commodity Gambling—Racing

Figure 13A:
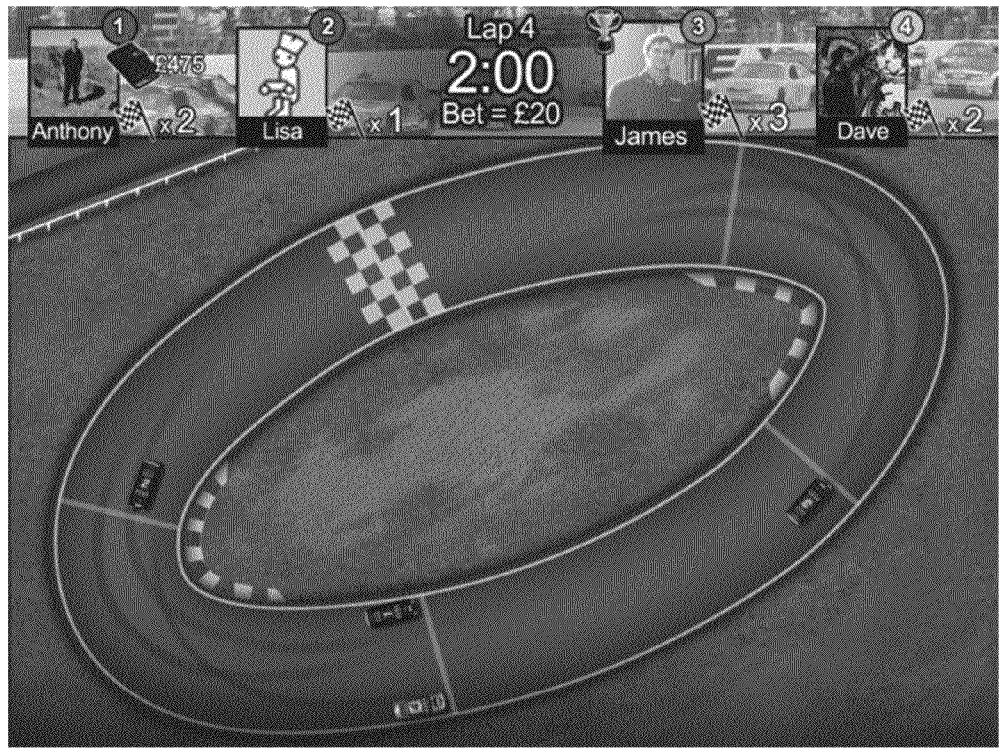
FIGS. 13A-13B illustrate exemplary entertaining experiences displayed as a racetrack according to the disclosed embodiment.
Figure 13B:
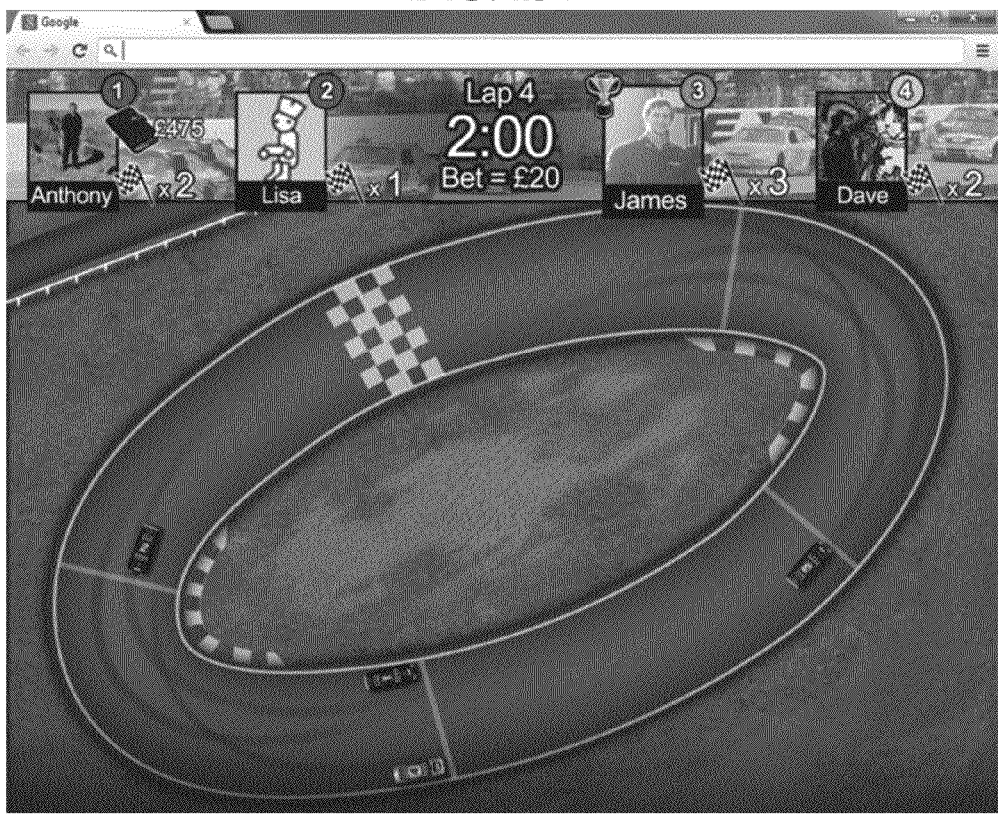
Figure 14A:
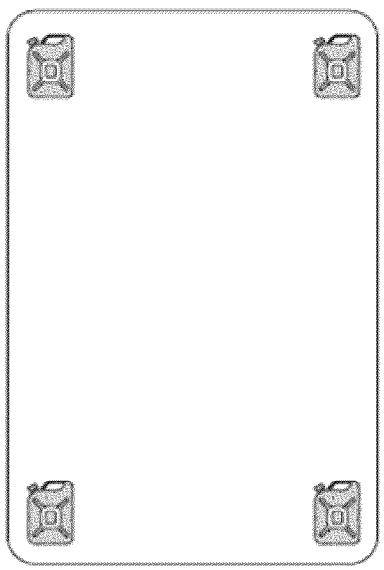
FIGS. 14A-M illustrate exemplary virtual playing cards that represent commodities according to the disclosed embodiment.
Figure 14B:
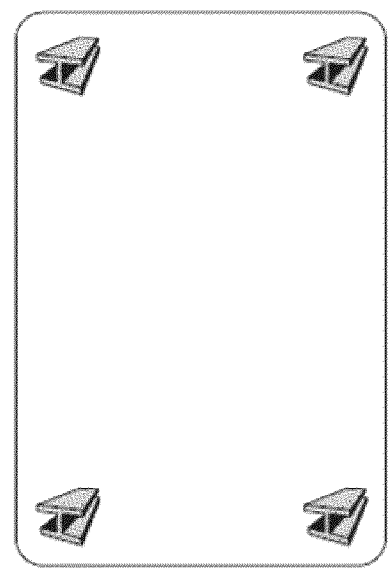
Figure 14C:
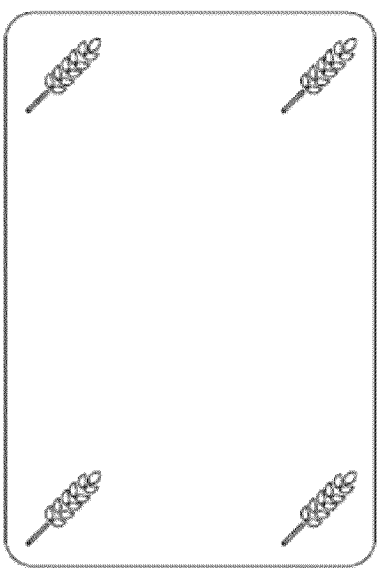
Figure 14D:
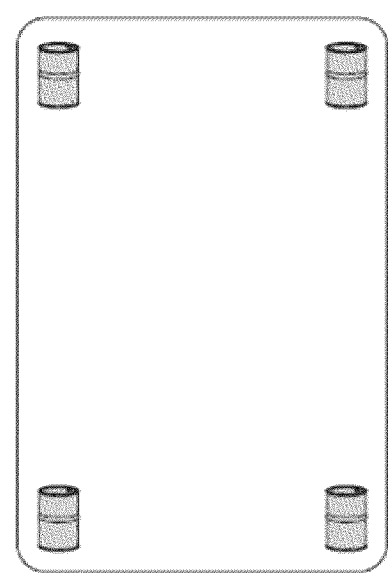
Figure 14E:
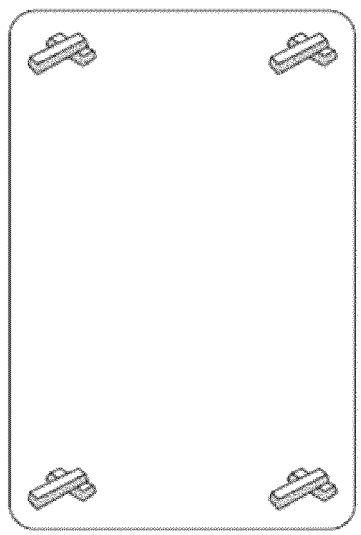
Figure 14F:
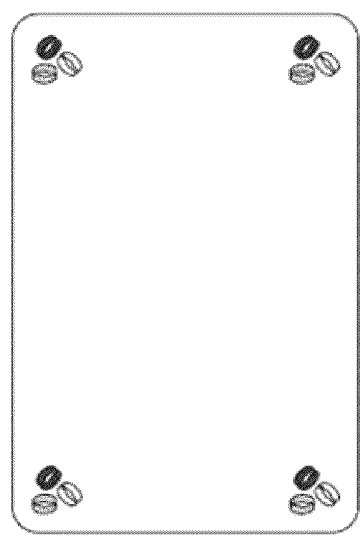
Figure 14G:
Figure 14H:
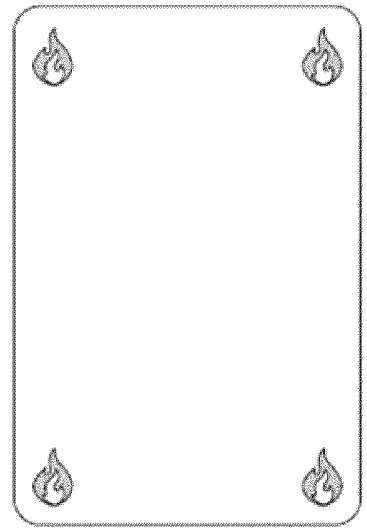
Figure 14I:
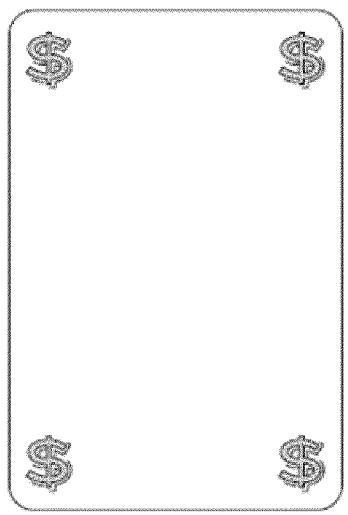
Figure 14J:
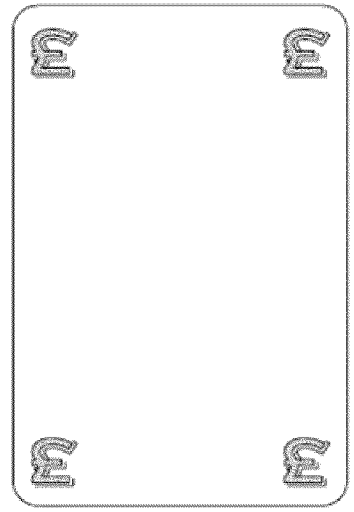
Figure 14K:
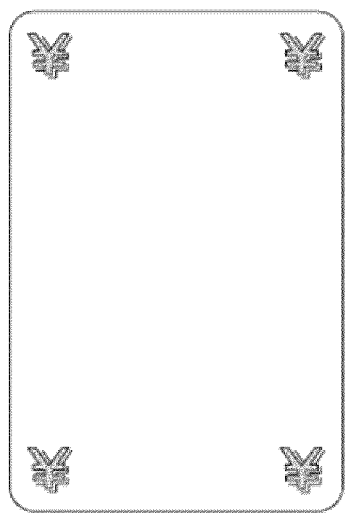
Figure 14L:
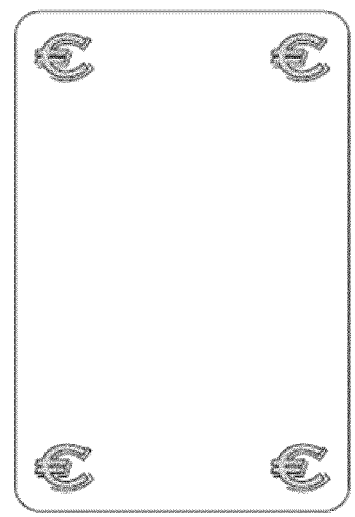
Figure 14M:
Figure 15A:
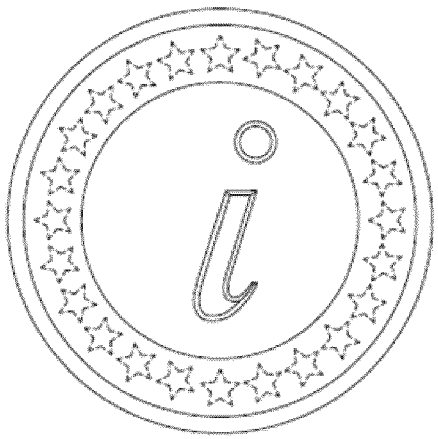
FIGS. 15A-E illustrate exemplary virtual currency coins and poker chips according to the disclosed embodiment.
Figure 15B:
Figure 15C:
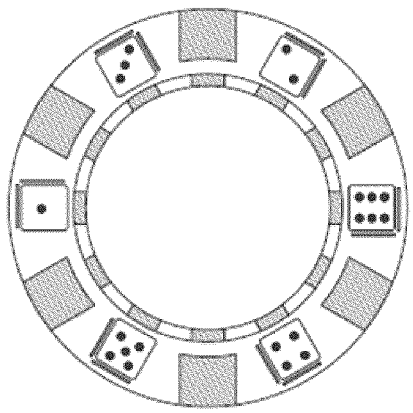
Figure 15D:
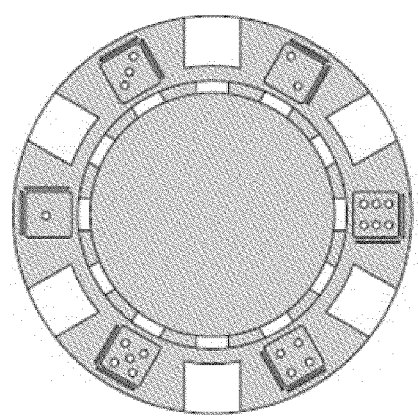
Figure 15E:
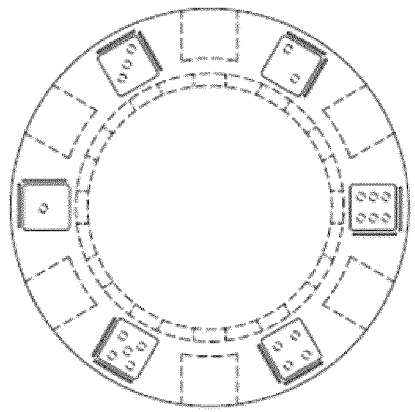

As described in this example and shown in FIGS. 13A and 13B, an aspect of the disclosed embodiment relates to a fun party based racing competition for up to four players. This competition is preferably played with all players beginning on the starting line. The competition is played in a series of rounds, and at the start of each round, all players place bets on their chosen commodity. A successful bet results in their car accelerating to the next position on the track, and a failure results in their car staying in place. These real-time states are preferably displayed in real-time during the competition. The first player to complete the specified number of laps wins. In the event of a tie, the competition goes to sudden death between the potential winners.

In more detail, the competition can begin with a player entering a lobby interface and choosing from a wide variety of competition setups. Specifically, each player can choose their commodity, their desired match up, the round time limit, the wager amount, and the like. For Example Player 1 chooses the following:

£VERSUS $
£20 per bet
2:00 minute rounds

When the competition begins, both players will choose which commodity will gain more at the start of each round, and they may have until the round time limit to change their selection. The selection of the commodity by each player may either be secret until the competition begins, or may be displayed to all players. For example:

Player 1 wagers that the pound will gain on the dollar
Player 2 wagers that the dollar will gain on the pound
Player 3 wagers that the dollar will gain on the pound
Player 4 wagers that the dollar will gain on the pound If a player guesses correctly, he sees his car advance to the next track position. If a player guesses incorrectly, he sees his car stay in place. For example, if the pound gained on the dollar, Player 1's car advanced one spot, Player 2's car stayed in place, Player 3's car stayed in place, and Player 4's car stayed in place.

Gameplay continues in this fashion until the end of the competition, for example, until one player completed the specified number of laps. For example, Player 1 completes three laps before the other players and wins the competition.

Example 4

Slots Game Engine

In this real-time fixed odds game, a Player chooses a currency, commodity or index from drop down menu. The Player chooses his competitive position (rise, fall, no movement), and odds can be presented. The Player can then choose his wager, if any.

During gameplay, a virtual slots reel can spin for a specified period of time, for example, 30 seconds. The movement of the commodity's value during the spinning can be displayed as an outcome when the reels stop spinning. The outcome is declared based on whether the Player's competitive position wins or loses. This slots engine allows for competition using single bets (i.e. single line slot) or multiple bets (each line a single bet). Different slots skins to be available (finance themed)

Example 5

Roulette Table Game Engine

In this real-time fixed odds game, a virtual roulette wheel shows rise, fall and no movement competitive positions for commodities instead of the traditional numbers. For example, the table may include a wide variety of currencies, commodities, indexes, and the like, and is preferably designed such that the each competitive position for each commodity is available for selection. Players can select individual positions or may instead select groups of similar positions, such as an aggregate rise/fall across multiple commodities.

Odds for each position can be presented, and the Player can then choose his wager, if any.

During gameplay, the roulette wheel can spin for a specified period of time, for example, 30 seconds. The movement of the commodity's value during the spinning can be displayed as an outcome by the virtual ball dropping into one of the positions on the wheel. The outcome is declared based on whether the Player's competitive position wins or loses.

Example 6

Penalty Shoot Out

This real-time fixed odds game is a variant of the soccer example described above. In this example, the entertaining experience is displayed as a goal with goal keeper (soccer, hockey, lacrosse, etc.). A Player chooses a currency, commodity or index from drop down menu. The Player chooses his competitive position (rise, fall, no movement), and odds can be presented. The Player can then choose his wager, if any.

After a specified period of time, the Player's avatar takes the penalty kick and either scores or misses depending on whether the competitive position is consistent with the real-time data (i.e. win or loss).

These game mechanics can be applied to any sport (e.g. throw a dart to hit correct result, golf swing gets hole in one if correct, etc.)

Example 7

Player Vs. Player Game Engines

In these real-time match-style games, Player 1 chooses a currency, commodity or index from drop down menu, for example, and then chooses his competitive position (rise, fall, no movement), odds, and a wager, if any. This challenge is presented to other users, and can preferably be withdrawn at any time prior to the challenge being accepted.

When a second user, Player 2, accepts the challenge, the competition begins. After a specified period of time, the outcome is displayed and either Player 1 or Player 2 takes the pot (minus house commission).

Game examples:
  Slots—Reel spins over a period of time then lands on result
  Roulette Wheel—Wheel spins over a period of time then ball drops in to correct result
  Penalty Shoot Out—Player 1 is penalty taker and Player 2 is goal keeper. After 30 seconds, either Player 1 scores or Player 2 saves
  Horse/Car Race—Player 1 races Player 2 over the specified period of time and then when result is declared relevant horse/car crosses the finish line first
  Darts—After the specified period of time, Player 1 throws a dart and then Player 2 throws a dart. Player 2's dart either lands in a higher or lower number depending on result
  Boxing—Player 1's Boxer trades blows with Player 2's Boxer over the specified period of time and then after result is declared either Player 1 or Player 2 gets knocked out Since the outcomes of the entertaining experiences described above are drive by the competitive positions of the Players and the real-time data, the game play and the results are not dependent on any interaction or skill on the part of any Player (other than choosing the bet).

Example 8

Multi-Player Pool Games

Real-time pool-style games allow for challenges to be issued to multiple players simultaneously using any game skin described above (e.g. slot, roulette wheel, penalty kick). For example, a particular type of competition may be offered on a notice board, with the pool entry being limited either by time or a maximum number of Players. The type of competition may be based on a specific commodity over a specific duration of time, for example, movement of Dollar over 30 seconds. Players can choose their bet (rise, fall or no movement) and stake. Size of stake determines payout if their bet is a winning one.

The current payout ratio in relation to each bet will be displayed in real time based on the then current value of the pool. Pool distributed amongst winning picks using appropriate payout ratio per £1 staked.

Payout ratio per £1 stakes is calculated as follows: (A minus B)/C where:
  A=the total aggregate value of all Stakes placed;
  B=[20%] of the total aggregate value of all Stakes placed on losing Bets (such sum representing the proportion of the pool retained by the house); and
  C=the total aggregate value of all Stakes placed on winning Bets.

Example 9

Multi-Player Bingo

Based on standard bingo rules, each Player purchases a card (or cards) each with various currencies and commodities with a corresponding price movement (rise, fall or no movement). Periodically (i.e. every 5 seconds) during the competition, a currency/commodity is chosen and the corresponding price move over the prior period. If a Player has that on his card, it is ticked off and so on until a Player gets a full line and then full house (After the entire competition period has lapsed). Players win a percentage of the pool (minus house commission)

Example 10

Peer-to-Peer Match Games

A slower, challenge based simulation game designed for two Players.

In a football match style entertaining experience, the game is played in a series of rounds. The game begins with the ball placed on the centre circle. At the start of the first round, Player 1 chooses whether the chosen currency/commodity will rise, fall or stay over the chosen period. If the bet is successful the ball moves towards the losing Player's goal. If it loses, the ball stays where it is. The next round, Player 2 makes his pick in the same way and either moves the ball forward or it stays where it is depending on the result. The game moves back to Player 1 and so on. The first Player to move the ball into the opposing goal within the set number of rounds wins. If no goal is scored then the winner is whoever is closest to their opponents goal at the end of the set number of rounds. In the event of a tie (i.e. the ball is on the centre circle), the game goes to sudden death (first person to get a pick right). Winning Player keeps the pot (minus house commission). Both Players preferably have a set time within which to play their round. It does not need to be played in real time.

In a penalty shoot out style entertaining experience, the game can be scored based on the highest number of picks out of 10 (or such other number). Each Player has set amount of time to play all their 10 rounds (it is not turn based). Player with the highest score at the end of 10 rounds wins the pot (minus house commission). Sudden death is played in the event of a tie.

The same match-style game mechanics can be applied to other game skins (i.e. highest number of correct picks either over a certain period or in a row), and can be used with multiplayer pools. Leaderboard functionality can also be integrated in to the game play and prizes offered for $1^{st}$, $2^{nd}$ and $3^{th}$, etc. Special events can also be created with playoff style tournaments. Players within the tournament pool are paired off and compete to be the ultimate champion

Graphical Playing Cards and Virtual Currencies

As described herein, wagers may be made using either real-world currencies or virtual currencies. In addition, the entertaining experiences may include digital playing cards that represent the commodity or virtual coins or other tender that represent the virtual currencies. For example, the entertaining experiences described herein may include a card game that is played with virtual playing cards that represent any number of commodities. Similarly, the entertaining experiences described herein may include casino style poker games, for example, that are played with virtual poker chips or coins that represent commodities or their values. FIGS. 14A-M illustrate exemplary virtual playing cards that represent commodities, and FIGS. 15A-E illustrate exemplary virtual currency coins and/or poker chips.

Computing Environment

The disclosed embodiment may be implemented on any suitable platform, including, for example, web-based applications, mobile applications, software, and the like, and may be accessed by users using any suitable computing device including, for example, computers, tablets, smart phones, mobile phone, PDA's, or any other suitable computing device. Exemplary computing devices include, for example, Apple-based computing devices (i.e. iMacs, iPhones, iPads, etc.), Android-based computing devices, Windows-based computing systems, and the like. The disclosed embodiments can also be implemented using browsers, such as Chrome, Firefox, Internet Explorer, Safari, and the like. The competitions of the disclosed embodiment may also be broadcast or displayed to one or more users on televisions or the like, for example, on a dedicated channel.

The methods of the disclosed embodiment are preferably computer-implemented and executed by one or more computing devices. In addition, the disclosed embodiment relates to apparatus comprising one or more processors and one or more memories operatively coupled to at least one of the one or more processors. The memories of an exemplary apparatus have instructions stored thereon that, when executed by at least one of the one or more processors, cause at least one of the one or more processors to carry out the steps of the exemplary methods. The disclosed embodiment further relates to non-transitory computer-readable media storing computer-readable instructions that, when executed by at least one of one or more computing devices, cause at least one of the one or more computing devices to carry out the steps of the exemplary methods.

Figure 16:
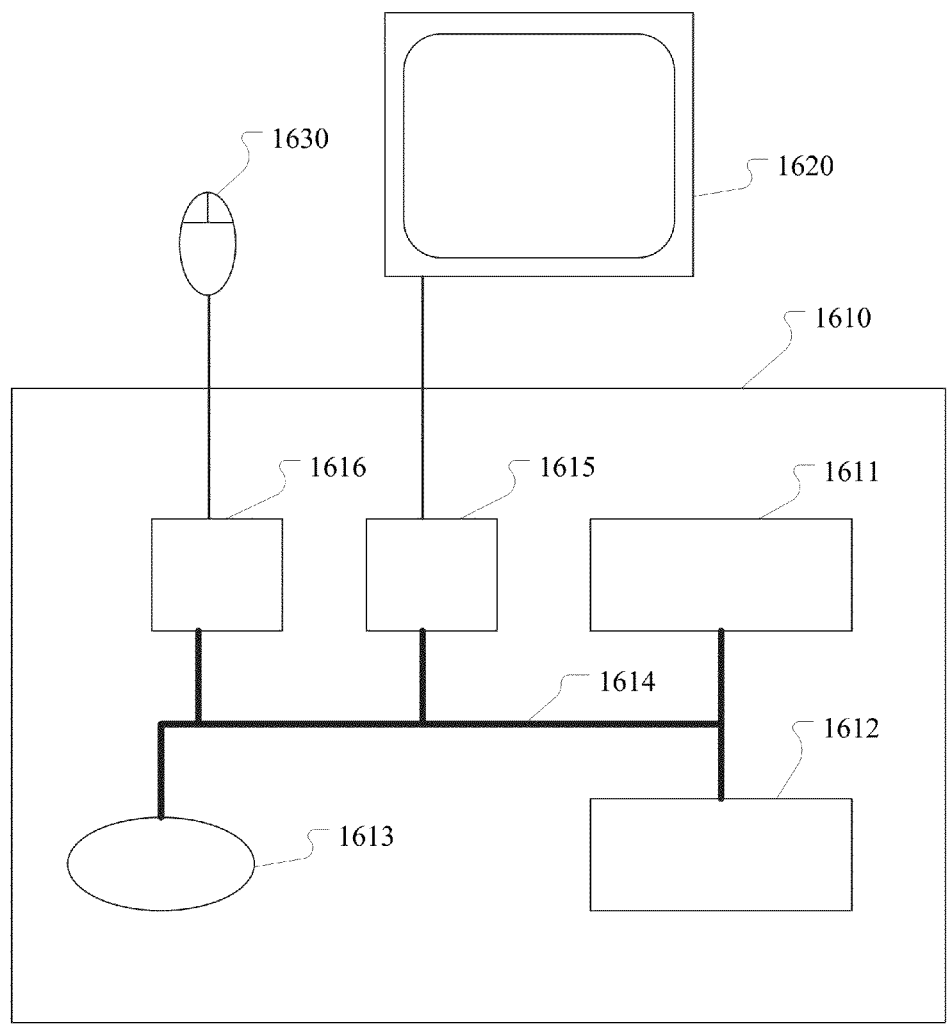
FIG. 16 illustrates an exemplary computing environment according to the disclosed embodiment.

The embodiments described herein may be implemented with any suitable hardware and/or software configuration, including, for example, modules executed on computing devices such as computing device 1610 of FIG. 16. Embodiments may, for example, execute modules corresponding to steps shown in the methods described herein. Of course, a single step may be performed by more than one module, a single module may perform more than one step, or any other logical division of steps of the methods described herein may be used to implement the processes as software executed on a computing device.

Computing device 1610 has one or more processing device 1611 designed to process instructions, for example computer readable instructions (i.e., code) stored on a storage device 1613. By processing instructions, processing device 1611 may perform the steps set forth in the methods described herein. Storage device 1613 may be any type of storage device (e.g., an optical storage device, a magnetic storage device, a solid state storage device, etc.), for example a non-transitory storage device. Alternatively, instructions may be stored in remote storage devices, for example storage devices accessed over a network or the internet. Computing device 1610 additionally has memory 1612, an input controller 1616, and an output controller 1615. A bus 1614 operatively couples components of computing device 1610, including processor 1611, memory 1612, storage device 1613, input controller 1616, output controller 1615, and any other devices (e.g., network controllers, sound controllers, etc.). Output controller 1615 may be operatively coupled (e.g., via a wired or wireless connection) to a display device 1620 (e.g., a monitor, television, mobile device screen, touch-display, etc.) In such a fashion that output controller 1615 can transform the display on display device 1620 (e.g., in response to modules executed). Input controller 1616 may be operatively coupled (e.g., via a wired or wireless connection) to input device 1630 (e.g., mouse, keyboard, touch-pad, scroll-ball, touch-display, etc.) In such a fashion that input can be received from a user (e.g., a user may input with an input device 1630 a dig ticket).

Of course, FIG. 16 illustrates computing device 1610, display device 1620, and input device 1630 as separate devices for ease of identification only. Computing device 1610, display device 1620, and input device 1630 may be separate devices (e.g., a personal computer connected by wires to a monitor and mouse), may be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing device 1610 may be one or more servers, for example a farm of networked servers, a clustered server environment, or a cloud network of computing devices.

While systems and methods are described herein by way of example and embodiments, those skilled in the art recognize that the disclosed embodiment is not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

Various embodiments of the disclosed embodiment have been disclosed herein. However, various modifications can be made without departing from the scope of the embodiments as defined by the appended claims and legal equivalents.

What is claimed is:

1. A computer-implemented method executed by one or more server-side computing devices for enabling real-time competition based on a live event, the method comprising:
    receiving, by at least one of the one or more server-side computing devices, information corresponding to a selection of a live event and a competitive position associated with the live event, the competitive position being based on changes to a criterion associated with the live event over a specified duration of time;
    transmitting, by at least one of the one or more server-side computing devices, information to a client-side computing device associated with the user for display as an entertaining experience during the specified duration of time, the entertaining experience including a graphical representation of a subject matter that is disparate from a subject matter of the live event, the entertaining experience indicating a real-time state of the competitive position relative to the real-time state of the criterion associated with the live event, the real-time state corresponding to a first state in which the competitive position is consistent with real-time data associated with the live event and a second state in which the competitive position is not consistent with the real-time data associated with the live event; and
    transmitting, by at least one of the one or more server-side computing devices, after the specified duration of time has ended, outcome information to the client-side computing device associated with the user, the outcome information indicating whether the real-time data at the end of the specified duration of time was consistent with the competitive position.

2. The method of claim 1, wherein the real-time state is updated periodically during the specified period of time based on whether the real-time state of the criterion associated with the live event is consistent with the competitive position.

3. The method of claim 1, wherein the subject matter of the graphical representation of the entertaining experience includes a virtual sporting event.

4. The method of claim 1, wherein the subject matter of the graphical representation of the entertaining experience includes a virtual casino game.

5. The method of claim 1, wherein the subject matter of the graphical representation of the entertaining experience includes digital playing cards or virtual coins.

6. A server-side apparatus for enabling real-time competition based on a live event, the server-side apparatus comprising:
    one or more processors; and
    one or more memories operatively coupled to at least one of the one or more processors and having instructions stored thereon that, when executed by at least one of the one or more processors, cause at least one of the one or more processors to:
        enable the receipt of information corresponding to a selection of a live event and a competitive position associated with the live event, the competitive position being based on changes to a criterion associated with the live event over a specified duration of time;
        enable the transmission of information to a client-side computing device associated with the user for display as an entertaining experience during the specified duration of time, the entertaining experience including a graphical representation of a subject matter that is disparate from a subject matter of the live event, the entertaining experience indicating a real-time state of the competitive position relative to the real-time state of the criterion associated with the live event, the real-time state corresponding to a first state in which the competitive position is consistent with real-time data associated with the live event and a second state in which the competitive position is not consistent with the real-time data associated with the live event; and
        enable the transmission, after the specified duration of time has ended, of outcome information to the client-side computing device associated with the user, the outcome information indicating whether the real-time data at the end of the specified duration of time was consistent with the competitive position.

7. The server-side apparatus of claim 6, wherein the real-time state is updated periodically during the specified period of time based on whether the real-time state of the criterion associated with the live event is consistent with the competitive position.

8. The server-side apparatus of claim 6, wherein the subject matter of the graphical representation of the entertaining experience includes a virtual sporting event.

9. The server-side apparatus of claim 6, wherein the subject matter of the graphical representation of the entertaining experience includes a virtual casino game.

10. The server-side apparatus of claim 6, wherein the subject matter of the graphical representation of the entertaining experience includes digital playing cards or virtual coins.

11. At least one non-transitory computer-readable medium storing computer-readable instructions that, when executed by one or more server-side computing devices, cause at least one of the one or more server-side computing devices to:
receive information corresponding to a selection of a live event and a competitive position associated with the live event, the competitive position being based on changes to a criterion associated with the live event over a specified duration of time;
transmit information to a client-side computing device associated with the user for display as an entertaining experience during the specified duration of time, the entertaining experience including a graphical representation of a subject matter that is disparate from a subject matter of the live event, the entertaining experience indicating a real-time state of the competitive position relative to the real-time state of the criterion associated with the live event, the real-time state corresponding to a first state in which the competitive position is consistent with real-time data associated with the live event and a second state in which the competitive position is not consistent with the real-time data associated with the live event; and
transmit, after the specified duration of time has ended, outcome information to the client-side computing device associated with the user, the outcome information indicating whether the real-time data at the end of the specified duration of time was consistent with the competitive position.

12. The at least one non-transitory computer-readable medium of claim 11, wherein the real-time state is updated periodically during the specified period of time based on whether the real-time state of the criterion associated with the live event is consistent with the competitive position.

13. The at least one non-transitory computer-readable medium of claim 11, wherein the subject matter of the graphical representation of the entertaining experience includes a virtual sporting event.

14. The at least one non-transitory computer-readable medium of claim 11, wherein the subject matter of the graphical representation of the entertaining experience includes a virtual casino game.

15. The at least one non-transitory computer-readable medium of claim 11, wherein the subject matter of the graphical representation of the entertaining experience includes digital playing cards or virtual coins.

16. At least one non-transitory computer-readable medium storing computer-readable instructions that, when executed by one or more client-side computing devices, cause at least one of the one or more client-side computing devices to:
transmit information corresponding to a selection of a live event and a competitive position associated with the live event, the competitive position being based on changes to a criterion associated with the live event over a specified duration of time;
receive information for display as an entertaining experience during the specified duration of time, the entertaining experience including a graphical representation of a subject matter that is disparate from a subject matter of the live event, the entertaining experience indicating a real-time state of the competitive position relative to the real-time state of the criterion associated with the live event, the real-time state corresponding to a first state in which the competitive position is consistent with real-time data associated with the live event and a second state in which the competitive position is not consistent with the real-time data associated with the live event; and
receive, after the specified duration of time has ended, outcome information indicating whether the real-time data at the end of the specified duration of time was consistent with the competitive position.

17. The at least one non-transitory computer-readable medium of claim 16, wherein the real-time state is updated periodically during the specified period of time based on whether the real-time state of the criterion associated with the live event is consistent with the competitive position.

18. The at least one non-transitory computer-readable medium of claim 16, wherein the subject matter of the graphical representation of the entertaining experience includes a virtual sporting event.

19. The at least one non-transitory computer-readable medium of claim 16, wherein the subject matter of the graphical representation of the entertaining experience includes a virtual casino game.

20. The at least one non-transitory computer-readable medium of claim 16, wherein the subject matter of the graphical representation of the entertaining experience includes digital playing cards or virtual coins.

* * * * *